United States Patent [19]

Kopczynski

[11] Patent Number: 4,964,480
[45] Date of Patent: Oct. 23, 1990

[54] ALL-TERRAIN VEHICLE

[76] Inventor: John F. Kopczynski, 1671 Sweeney St., North Tonawanda, N.Y. 14120

[21] Appl. No.: 454,420

[22] Filed: Dec. 21, 1989

[51] Int. Cl.⁵ ............................................. B62D 61/10
[52] U.S. Cl. .................................. 180/22; 180/24.08; 180/24.13; 280/682; 280/685
[58] Field of Search ................... 180/22, 24.08, 24.13; 280/682, 685

[56] References Cited

U.S. PATENT DOCUMENTS

| | | |
|---|---|---|
| 1,450,472 | 4/1923 | Wickersham . |
| 1,479,348 | 1/1924 | Wickersham . |
| 1,480,279 | 1/1924 | MacLachlan . |
| 1,503,616 | 8/1924 | Wickersham . |
| 2,063,035 | 12/1936 | Fuller et al. ............................. 305/9 |
| 2,103,381 | 12/1937 | Perkins et al. ...................... 280/124 |
| 2,403,833 | 7/1946 | Spangler ......................... 280/104.5 |
| 2,434,693 | 1/1948 | Graham ............................... 180/9.1 |
| 2,642,144 | 6/1953 | Brewer, Jr. ............................. 180/22 |
| 2,716,358 | 8/1955 | Pool et al. .............................. 74/710 |
| 2,954,833 | 10/1960 | Davidson ............................. 180/9.2 |
| 3,049,187 | 8/1962 | Medley et al. ...................... 180/79.2 |
| 3,189,116 | 6/1965 | Steffen ................................ 180/9.5 |
| 3,204,713 | 9/1965 | Shanahan et al. ..................... 180/5 |
| 3,315,977 | 4/1967 | Small .............................. 280/104.5 |
| 3,323,610 | 6/1967 | Kress et al. ......................... 180/79.2 |
| 3,351,037 | 11/1967 | Meili ..................................... 115/1 |
| 3,397,896 | 8/1968 | Willetts .......................... 280/104.5 |
| 3,495,672 | 2/1970 | Barr ...................................... 180/48 |
| 3,506,079 | 4/1970 | Madler et al. ........................ 180/22 |
| 3,576,226 | 4/1971 | Copeland ............................ 180/9.5 |
| 3,631,615 | 1/1972 | Reinsma et al. .................. 37/126 R |
| 3,744,857 | 7/1973 | Schoonover ........................ 305/10 |
| 3,756,619 | 9/1973 | Thorsell ............................... 280/104 |
| 3,784,131 | 1/1974 | Stratford ........................ 244/102 R |
| 3,809,004 | 5/1974 | Leonheart ........................... 115/1 R |
| 4,185,854 | 1/1980 | Brando ............................... 280/677 |
| 4,194,584 | 3/1980 | Kress et al. .................... 180/9.24 R |
| 4,359,116 | 11/1982 | Mankey ............................. 180/6.48 |
| 4,732,053 | 3/1988 | Gleasman et al. ................ 74/665 L |

FOREIGN PATENT DOCUMENTS

| | | |
|---|---|---|
| 515376 | 3/1921 | France . |
| 47739 | 6/1937 | France . |
| 359322 | 3/1938 | Italy . |
| 305340 | 2/1929 | United Kingdom . |

Primary Examiner—Kenneth R. Rice
Attorney, Agent, or Firm—Joseph P. Gastel

[57] ABSTRACT

An all-terrain vehicle including centrally pivoted bogies on opposite sides of the vehicle body with main wheels and auxiliary wheels mounted on opposite ends of the bogies with the auxiliary wheels extending further outwardly from the vehicle body than the main wheels, stabilizing sockets on the bogies for receiving arms mounted on the vehicle body for supporting the bogies against lateral deflection, a linkage including an elongated link extending crosswise of the vehicle body and pivotally mounted on a standard, and links mounted between the ends of the elongated link and the bogies for effectively coupling bogies on opposite sides of the vehicle body to each other. A positive drive is provided to both the main wheels and the auxiliary wheels to cause them to rotate at the same peripheral speeds. An all-terrain vehicle including levers pivotally mounted at their inner ends on the vehicle body, wheels mounted at the outer ends of the levers, stabilizing arms on the vehicle body extending into stabilizing sockets on the outer ends of the levers, a standard on the vehicle body, elongated links pivotally mounted on the standard and extending crosswise of the vehicle body, and links having first ends connected to the outer ends of the elongated link and second ends pivotally connected to the levers. An all-terrain vehicle of the above type including a steering linkage for the wheels on the pivotal bogies and also including a positive drive to the steerable wheels.

67 Claims, 15 Drawing Sheets

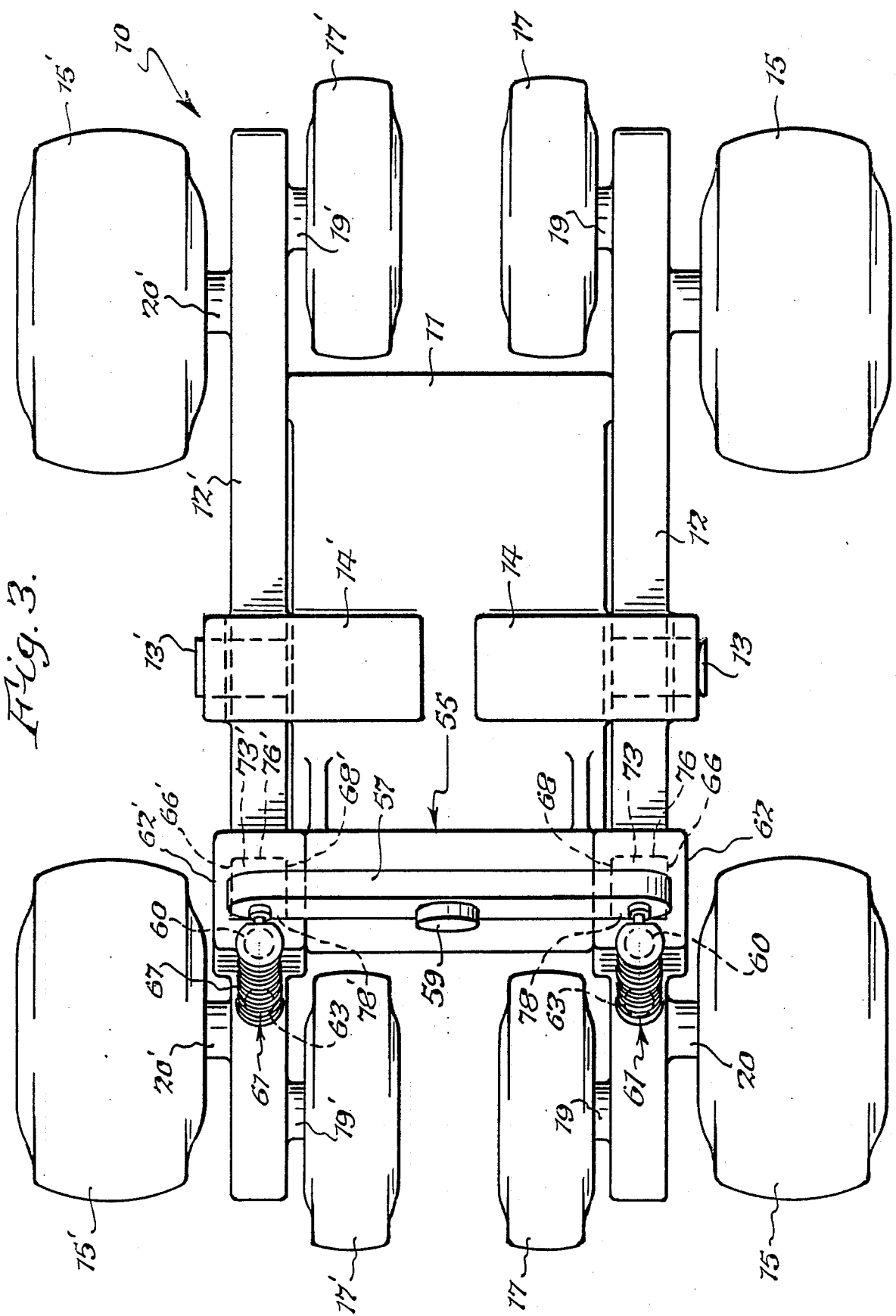

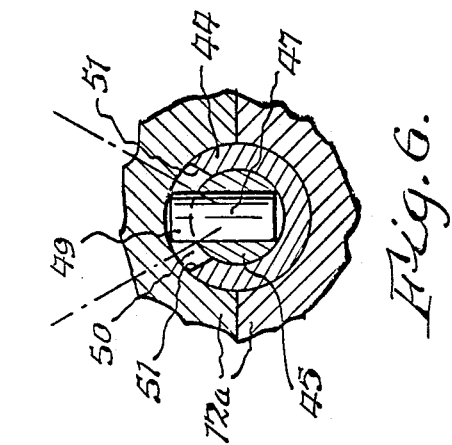
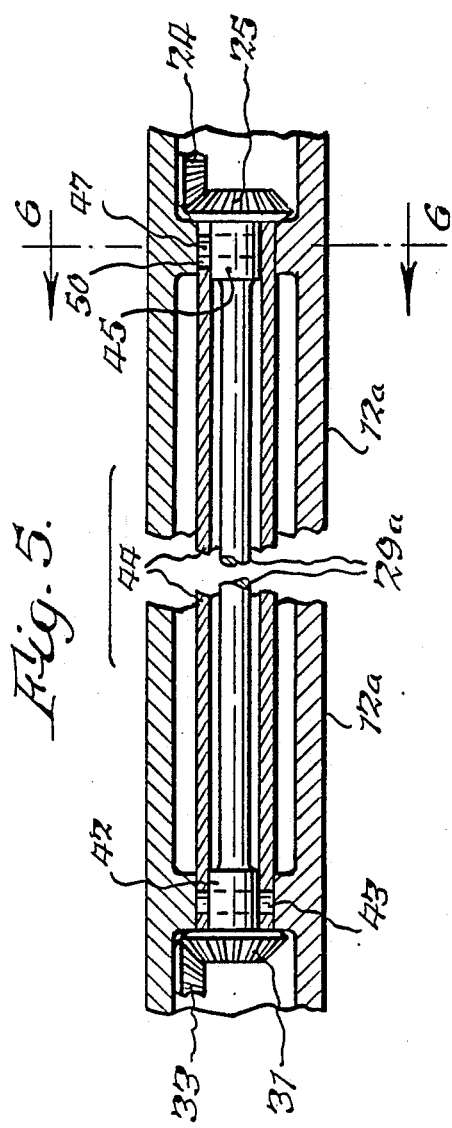
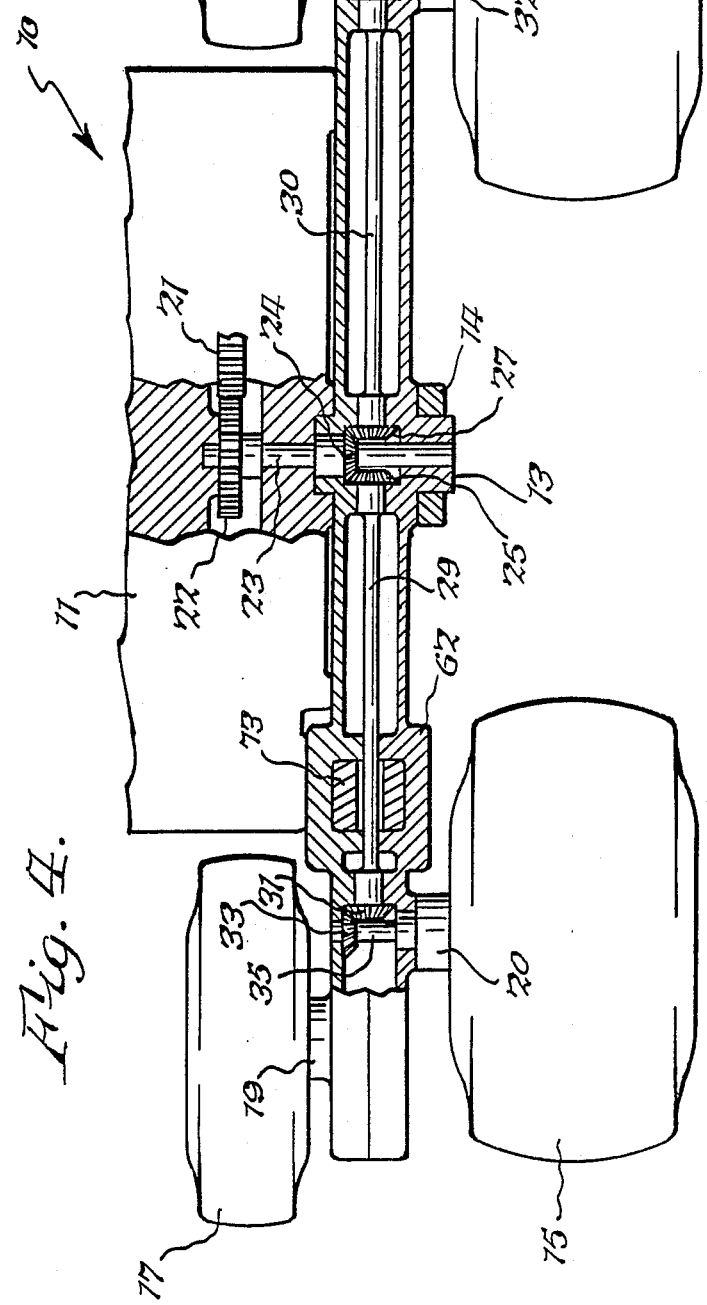

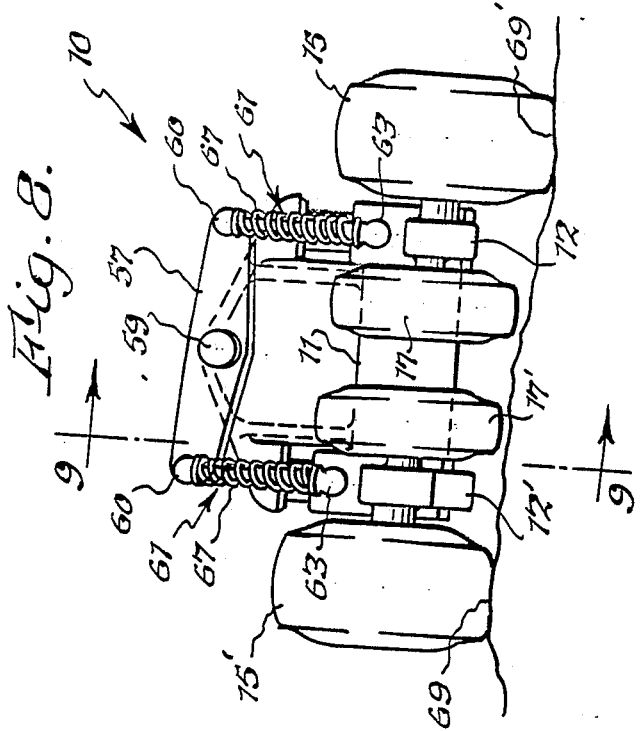
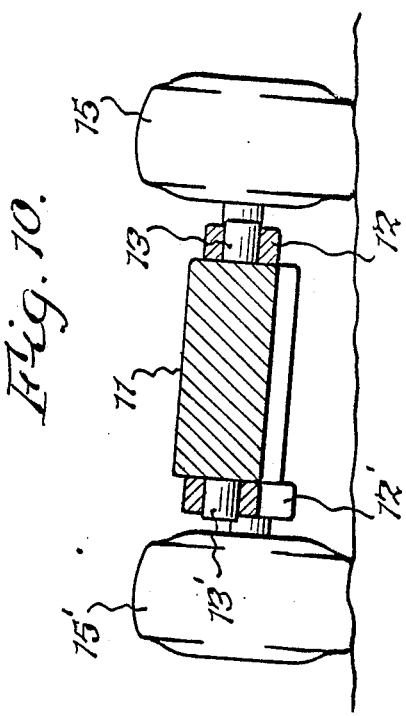
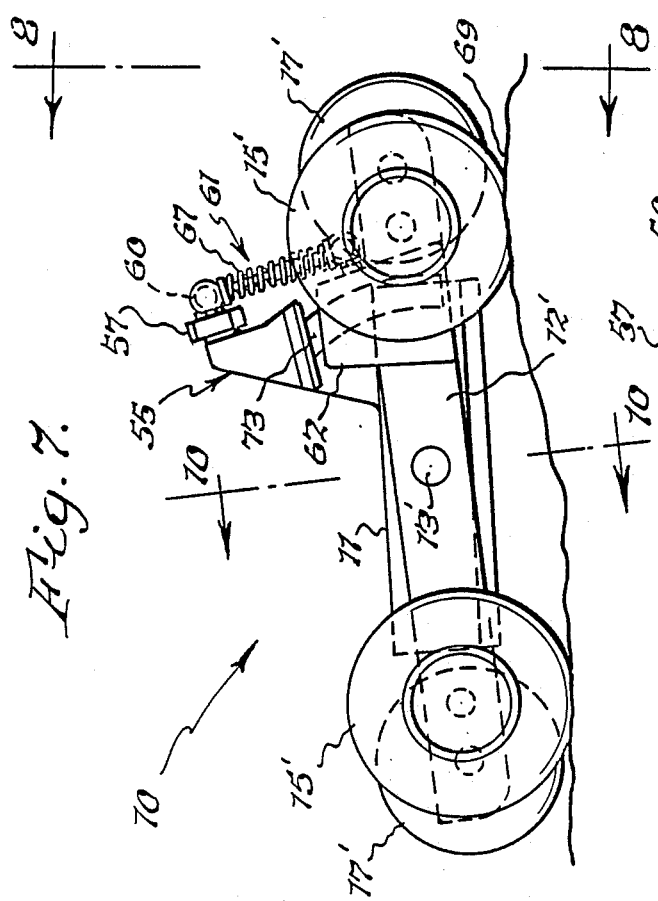
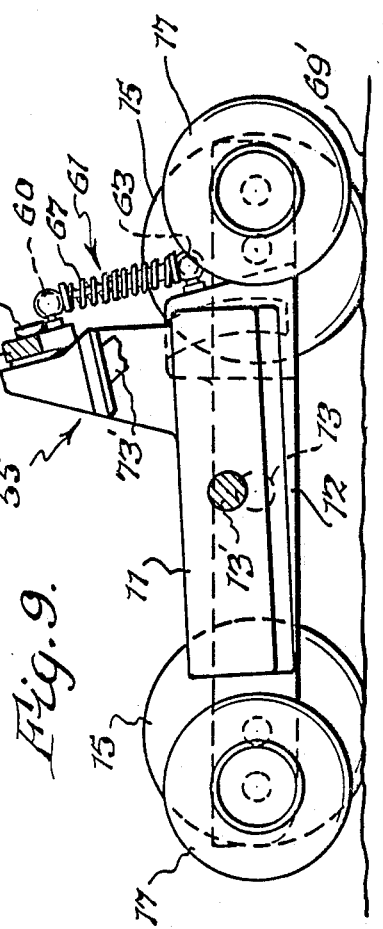

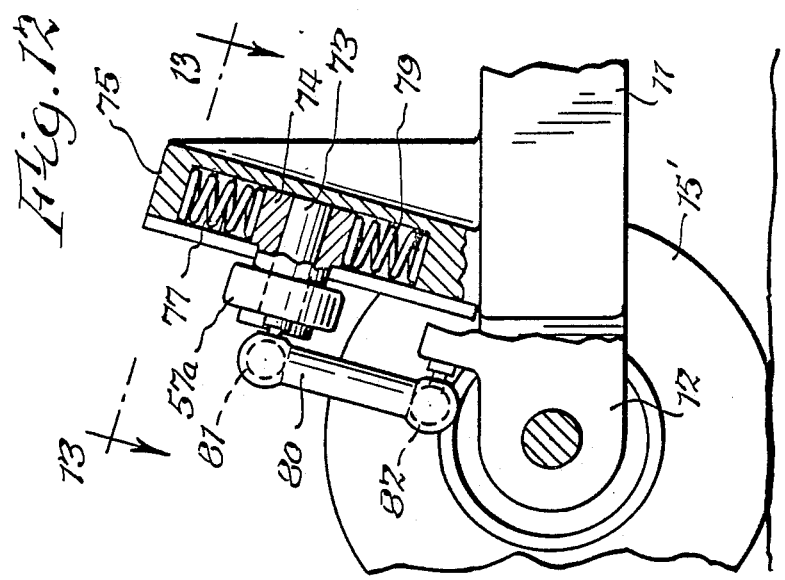
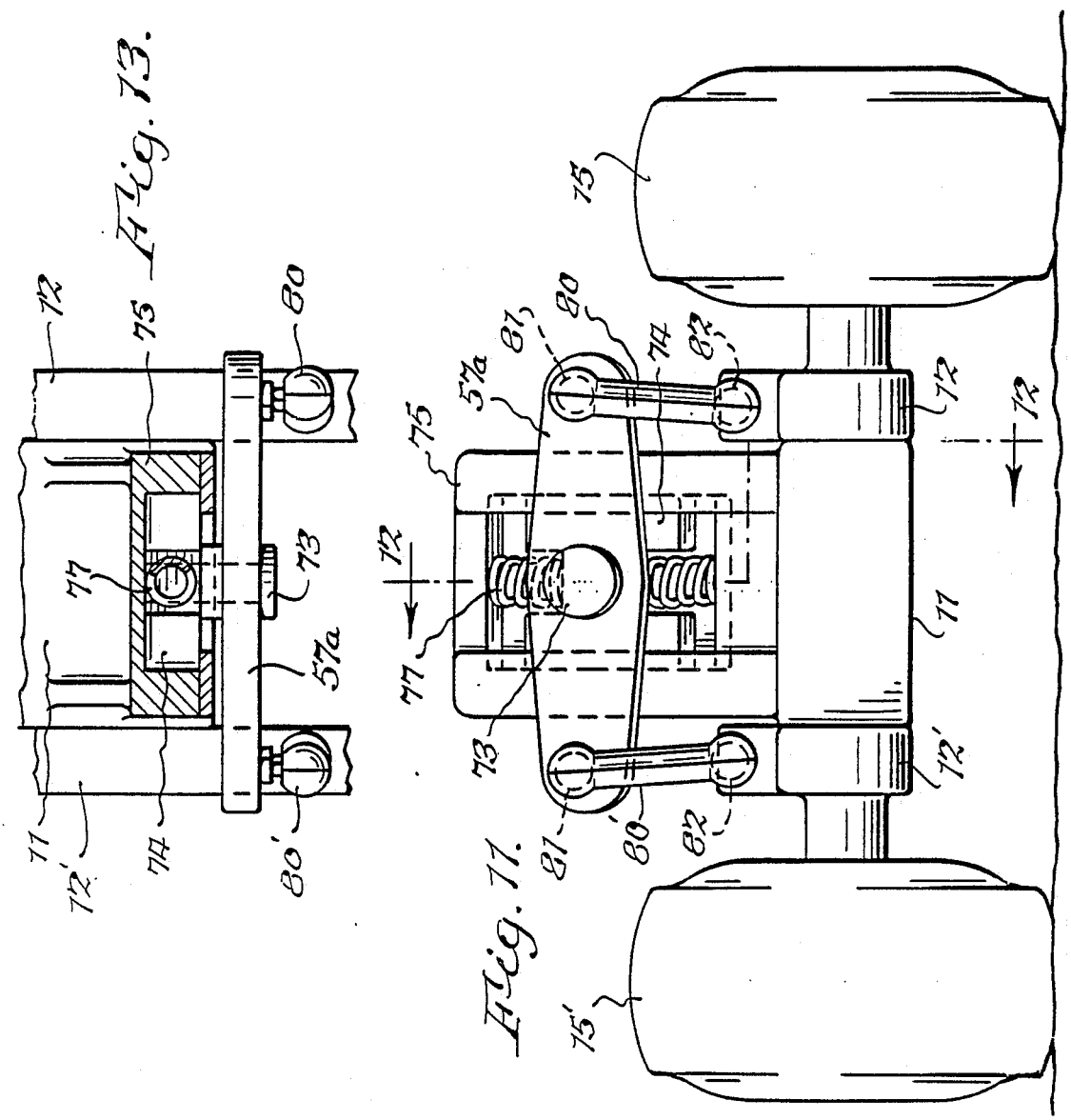

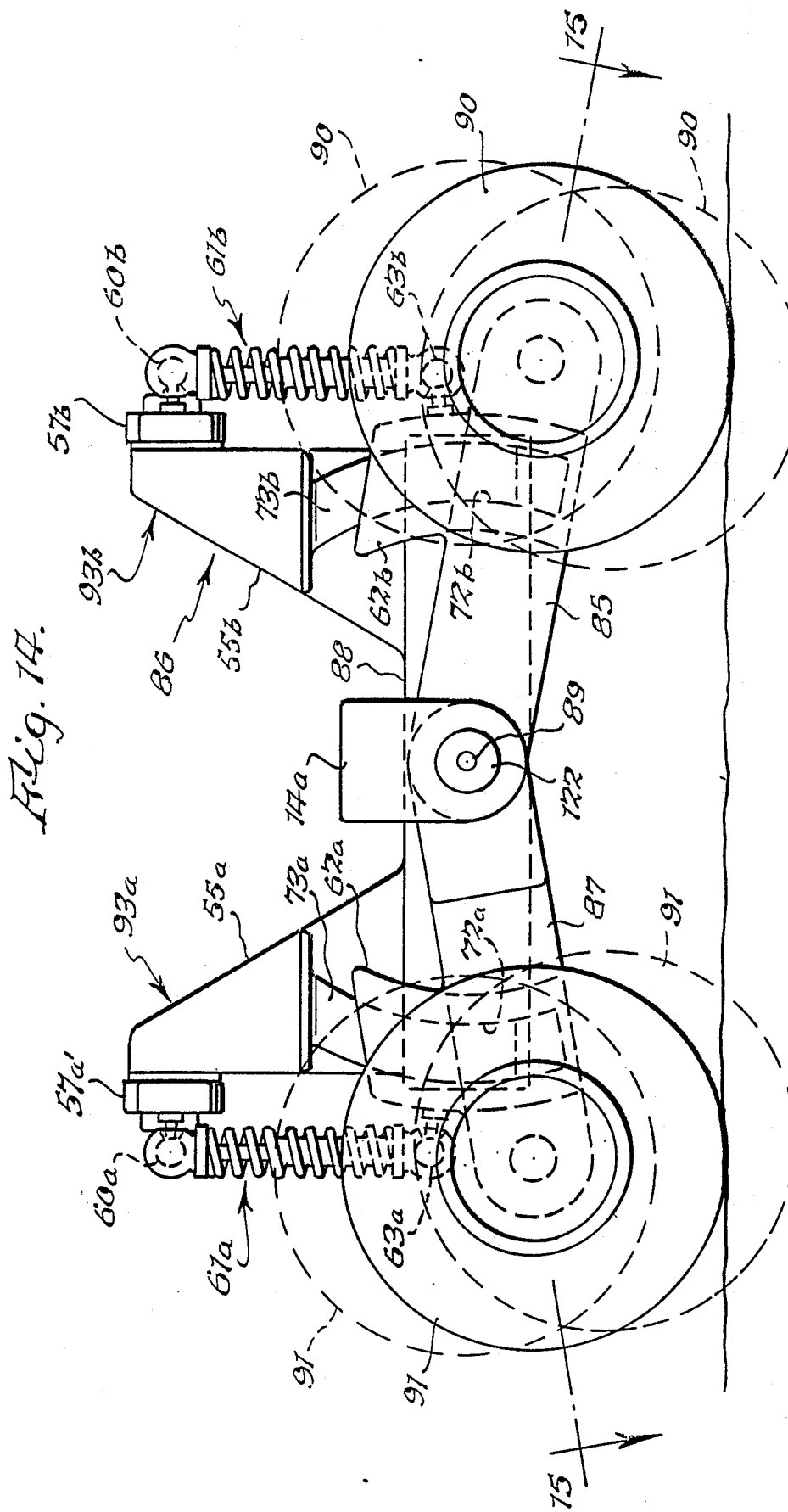

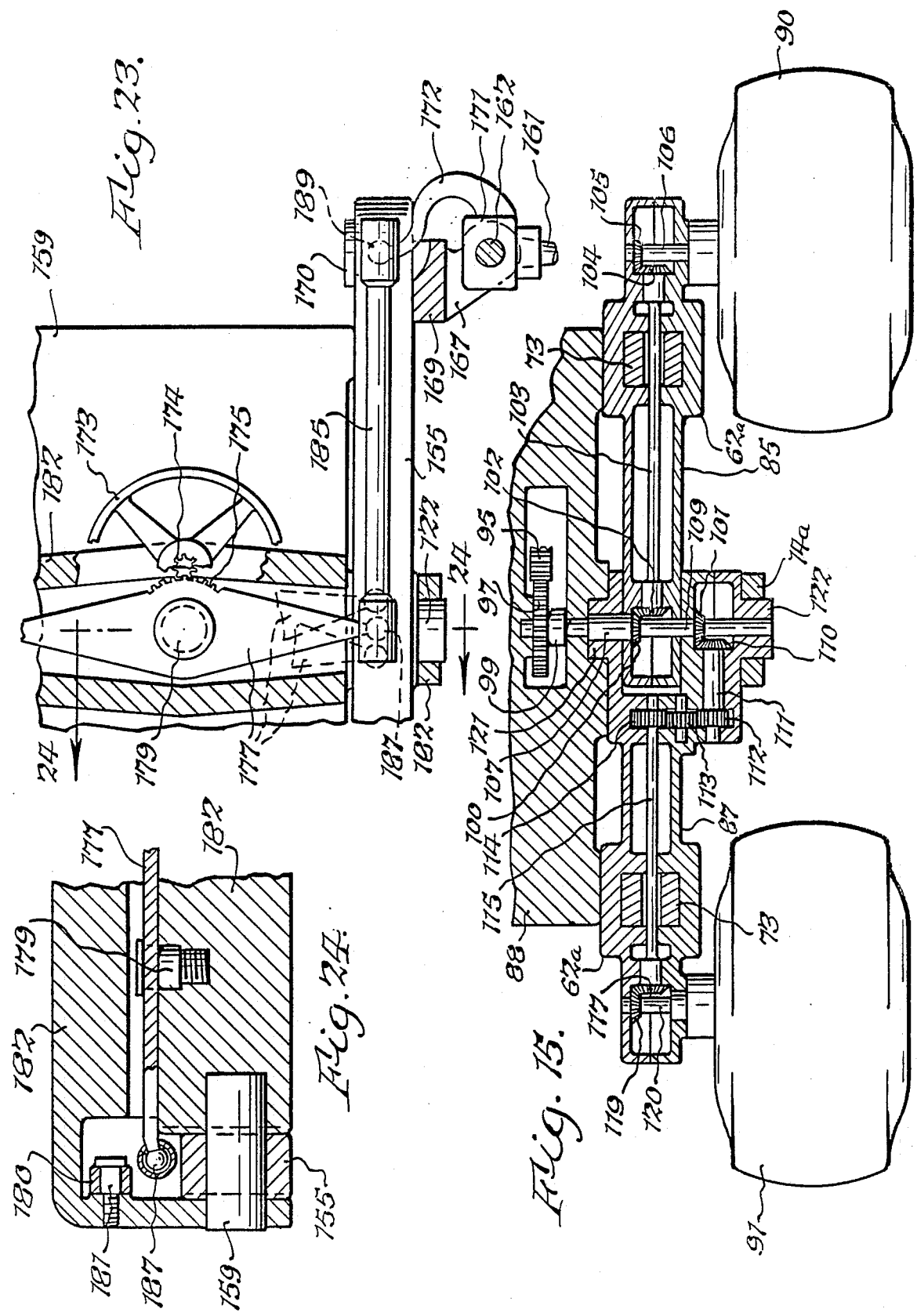

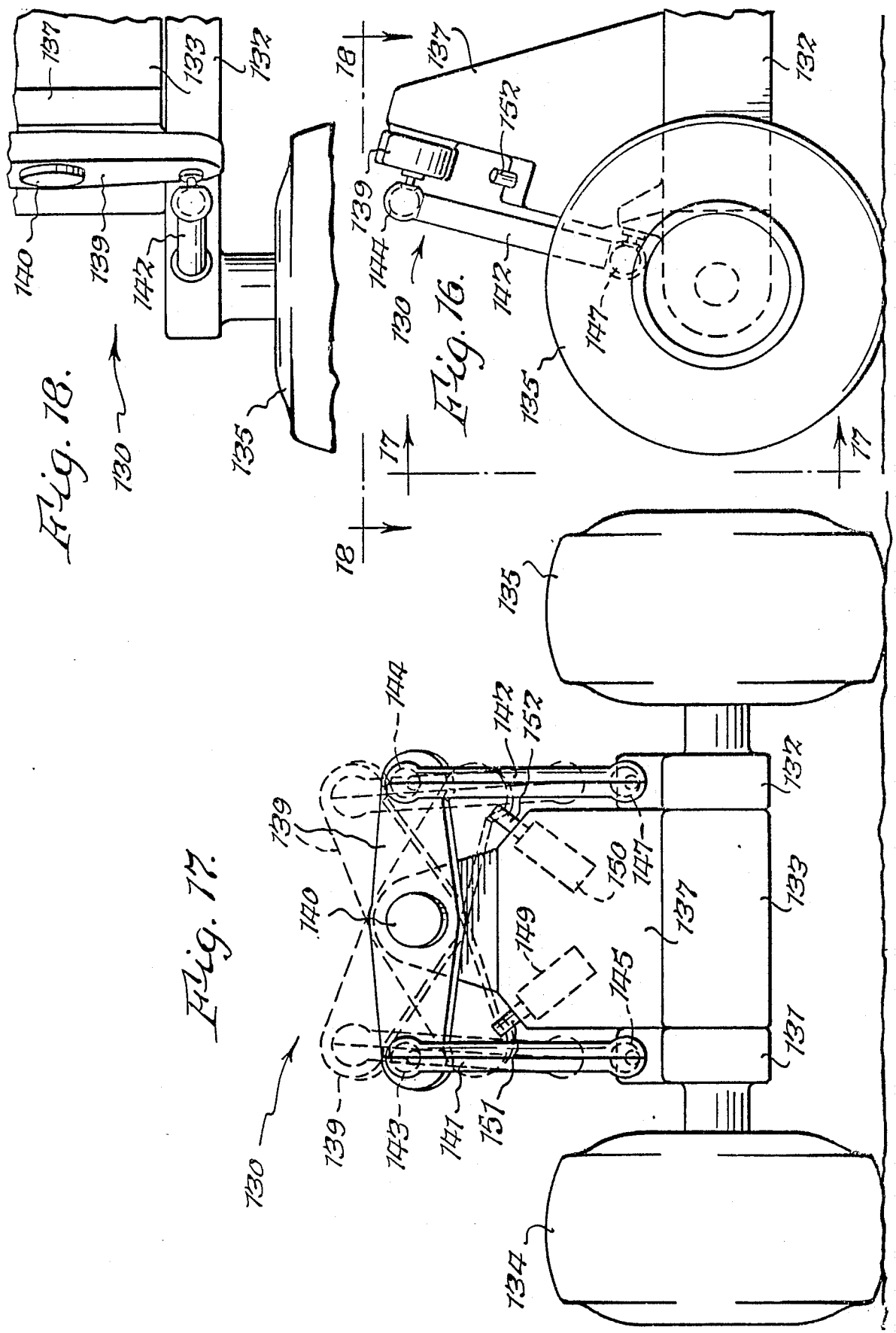

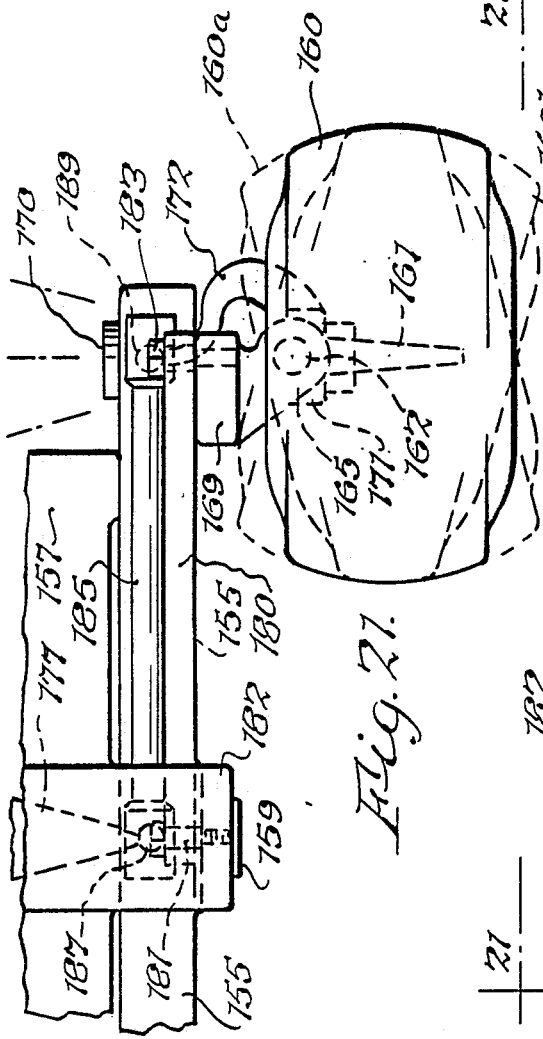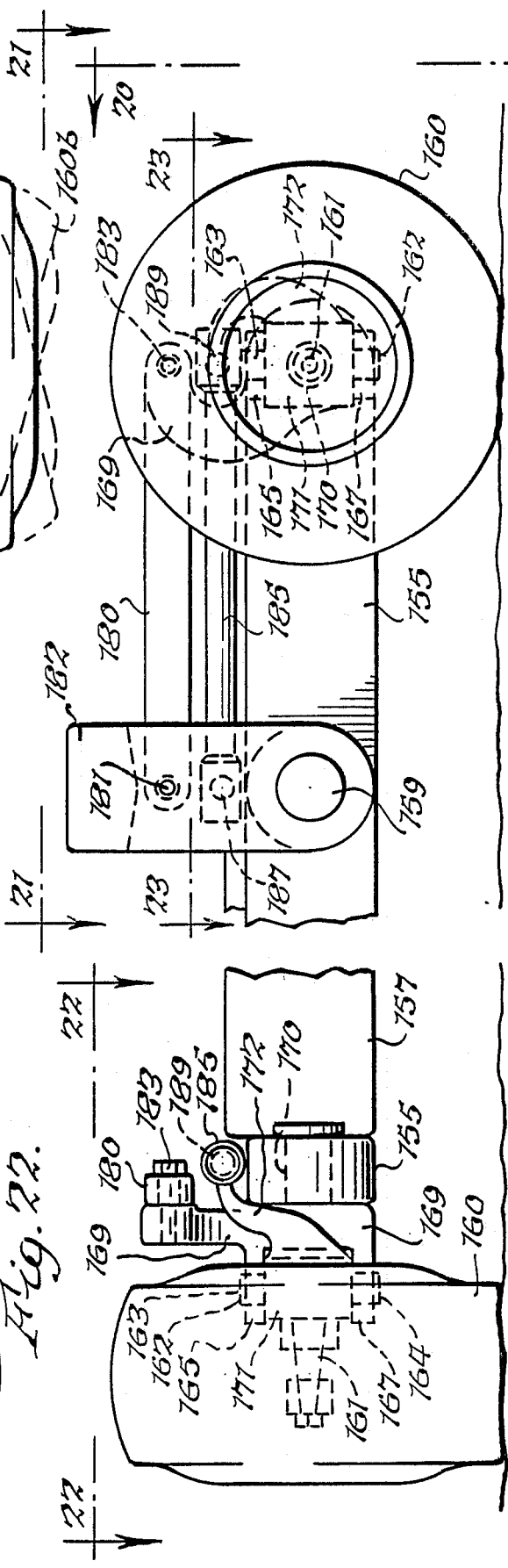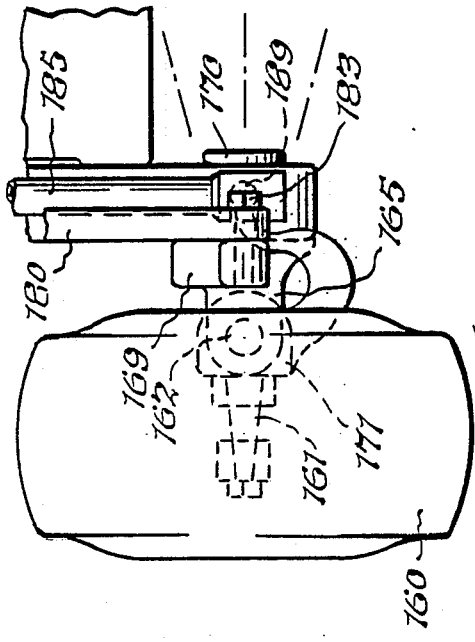

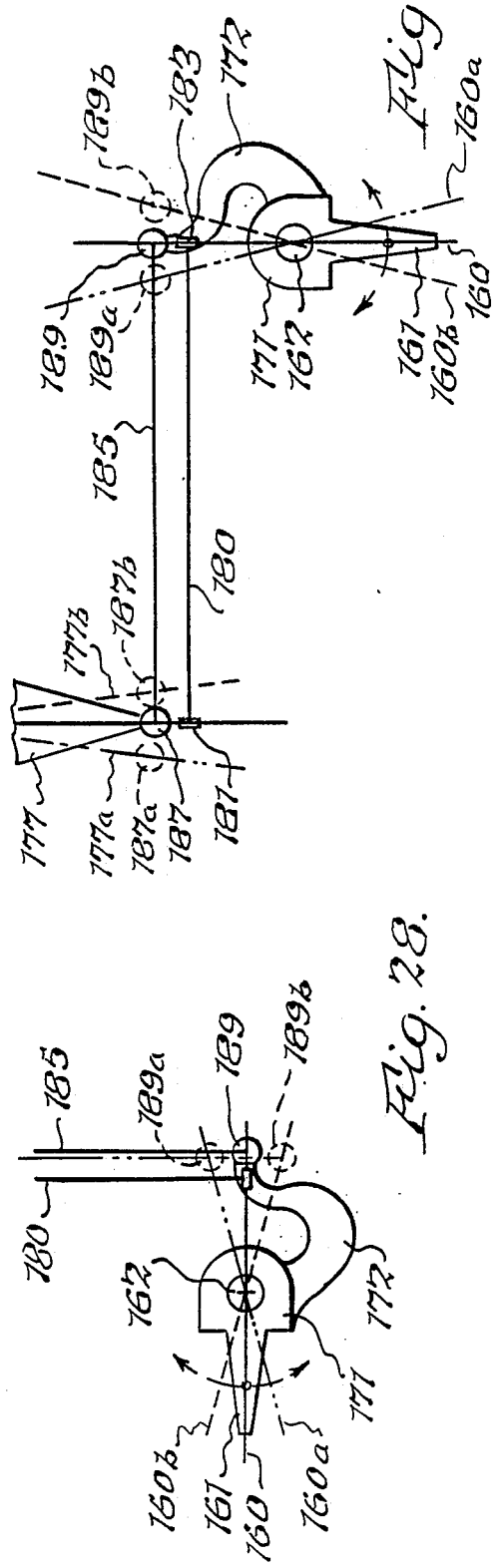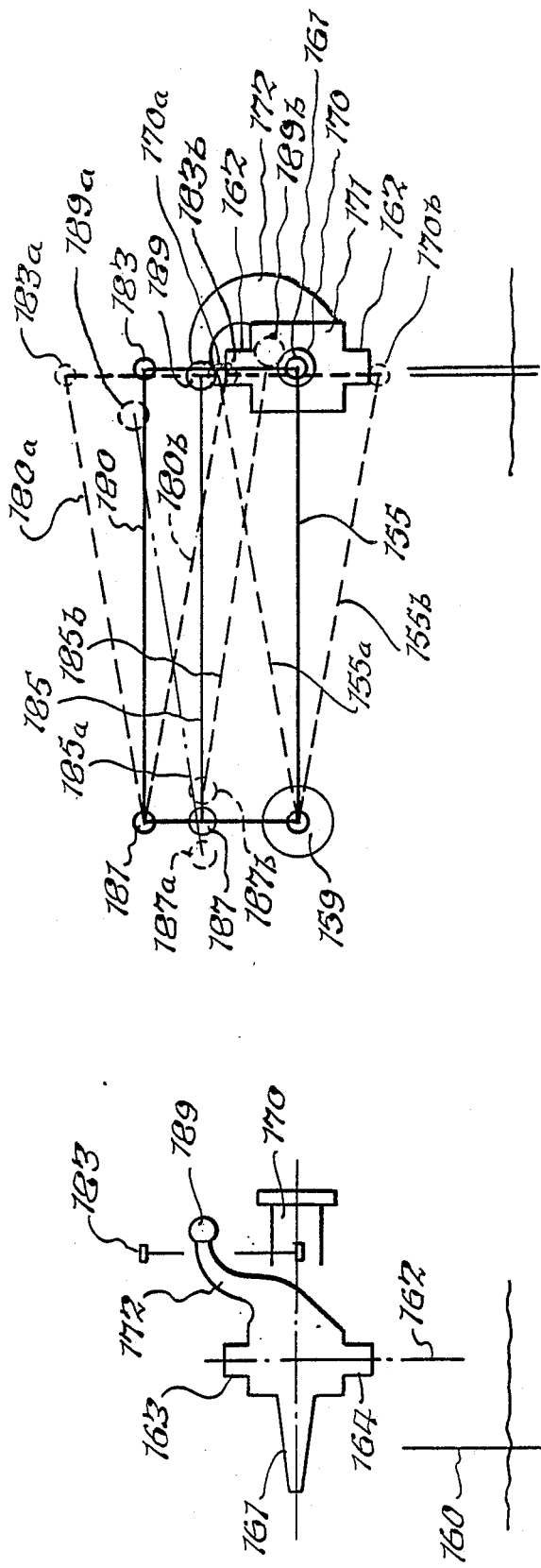

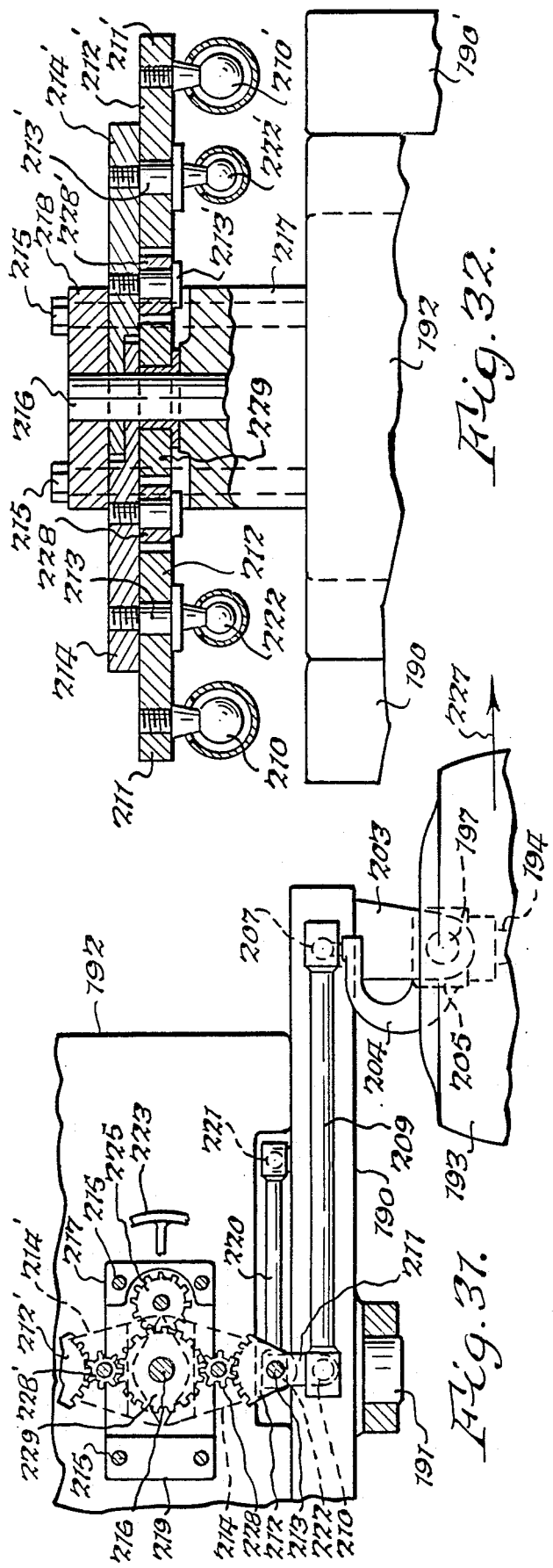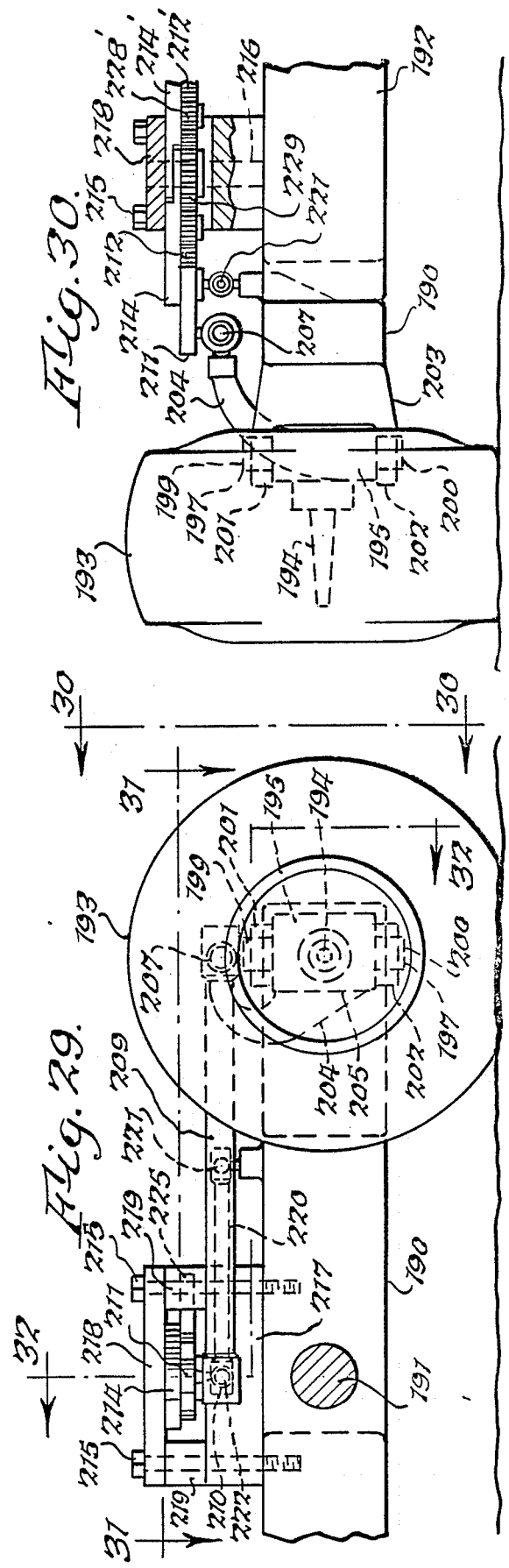

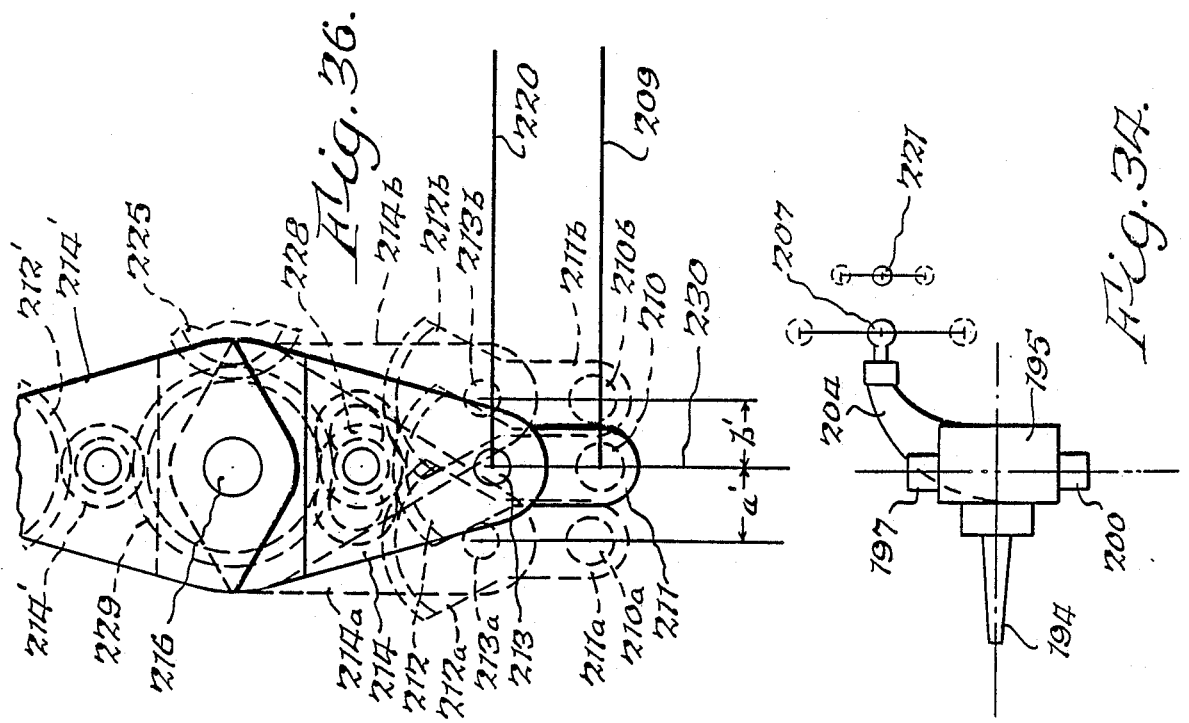
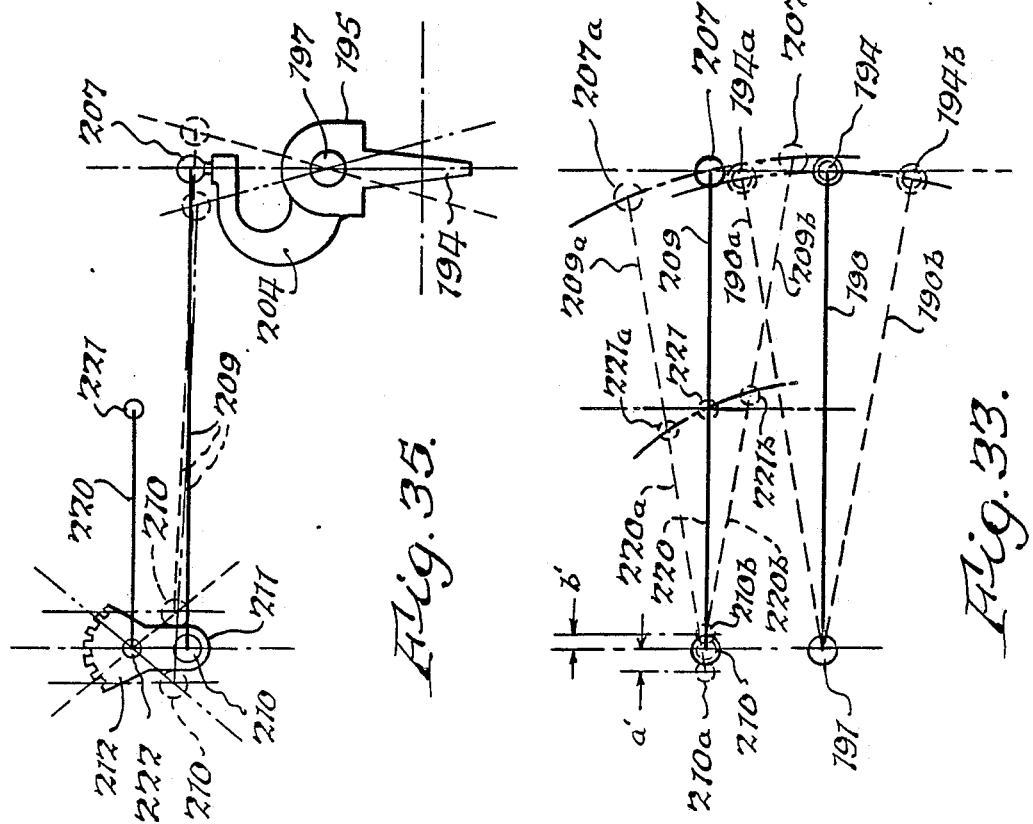

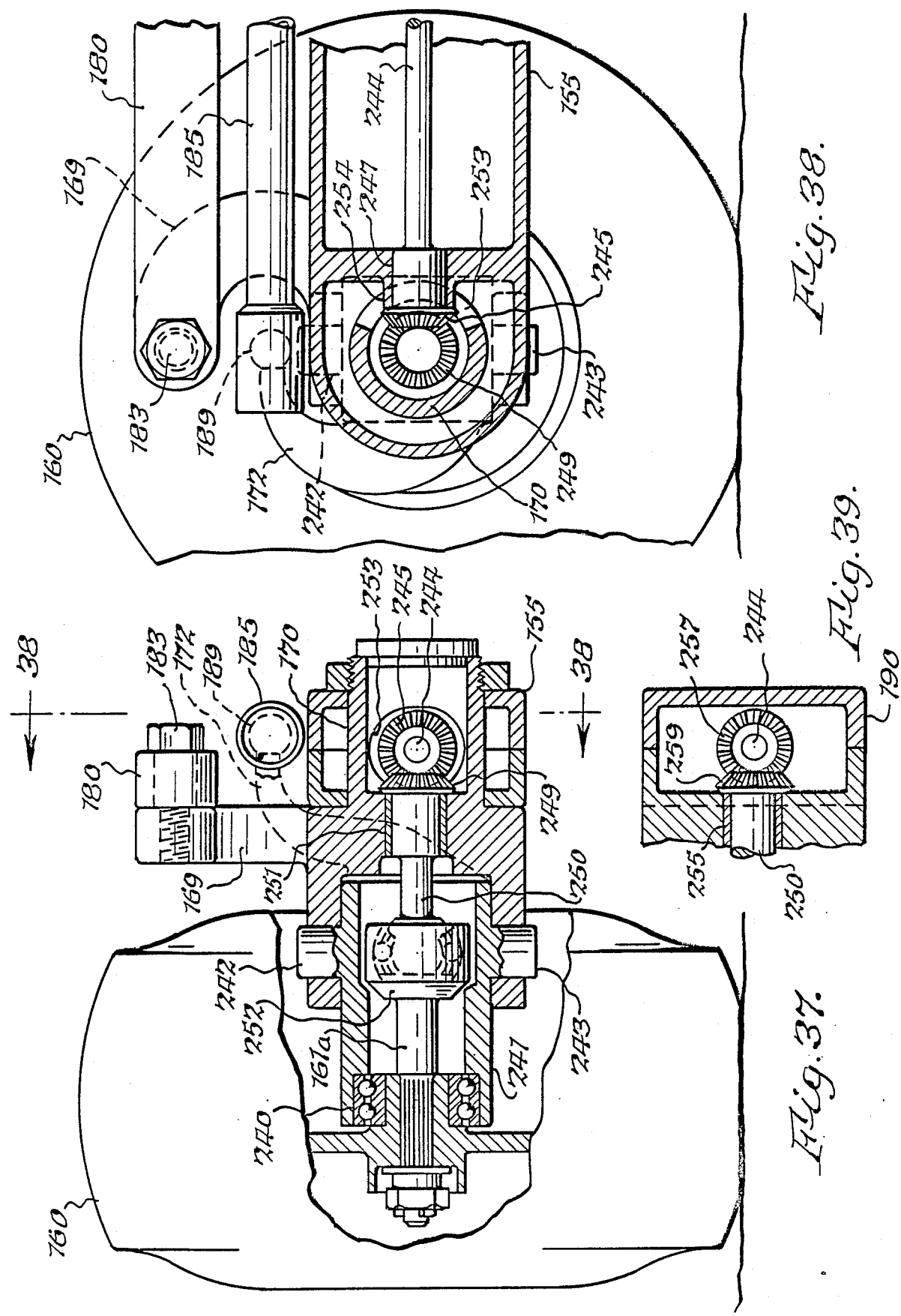

ALL-TERRAIN VEHICLE

BACKGROUND OF THE INVENTION

The present invention relates to an all-terrain vehicle and includes improvements and modifications of the subject matter disclosed and claimed in copending application Ser. No. 319,127, filed Mar. 3, 1989.

SUMMARY OF THE INVENTION

It is one object of the present invention to provide an improved all-terrain vehicle having only a centrally pivoted bogie on each opposite side of the vehicle and wheels mounted on the outer ends of the bogies. A related object is to provide the foregoing type of vehicle with structure for stabilizing the bogies against lateral deflection while permitting pivotal movement of the bogies in a vertical plane. A further related object is to provide an improved structure for supporting the outer ends of bogies on opposite sides of the vehicle against lateral deflection.

Another object of the present invention is to provide an improved all-terrain vehicle having centrally pivoted bogies on opposite sides thereof with main wheels mounted on the outer sides at opposite ends of each of the bogies and smaller diameter auxiliary wheels mounted on the inner sides of opposite ends of each of the bogies with the auxiliary wheels being located outwardly a greater distance than the main wheels. A related object of the present invention is to provide positive drives to all of the main wheels and auxiliary wheels.

A further object of the present invention is to provide an improved all-terrain vehicle wherein wheels are mounted on the outer ends of levers which have inner ends pivotally mounted on the vehicle. A related object is to provide improved structure mounted on the vehicle body for coupling the outer ends of each of the corresponding levers on opposite sides of the vehicle to each other and also having structure for stabilizing each of the levers against lateral deflection while permitting them to pivot in vertical planes. A further related object is to provide a positive drive to each of the wheels of the vehicle mounted in the foregoing manner.

Yet another object of the present invention is to provide an improved all-terrain vehicle having wheels which are mounted on pivotal bogies and which are steerable by means of unique linkages.

Still another object of the present invention is to provide an all-terrain vehicle having wheels which are mounted on pivotal bogies and which are steerable and which are positively driven. Other objects and attendant advantages of the present invention will readily be perceived hereafter.

The present invention relates to a vehicle comprising a body, elongated links having outer end portions, pivot means mounting said elongated links on opposite sides of said body with said outer end portions extending beyond said body, inner and outer sides on said elongated links, a main wheel mounted outwardly of said outer side of each of said end portions of said elongated links, an auxiliary wheel mounted inwardly of said inner sides of each of said elongated links, and said auxiliary wheels on said links extending further outwardly away from said body than said main wheels to thereby engage an obstruction in the path of both in advance of the other.

The present invention also relates to a vehicle comprising a body, first elongated links each having a first central portion and first outer end portions, first pivot means pivotally mounting said first central portions of said first elongated links on opposite sides of said body, wheels mounted on said first outer end portions of said elongated links, a standard on said body, a second elongated link having a second central portion and second outer end portions, second pivot means pivotally mounting said second central portion on said standard with said second elongated link extending crosswise of said body, third elongated links having first and second ends, first connecting means movably connecting said second outer end portions of said second elongated link to said first ends of said third elongated links, and second connecting means movably connecting said first outer ends of said first elongated links to said second ends of said third elongated links.

The present invention also relates to a vehicle comprising a vehicle body, elongated links, wheels mounted on said elongated links, pivot means pivotally mounting said elongated links on opposite sides of said body, and stabilizing means coupled between said elongated links and said body for stabilizing said elongated links against lateral deflection.

The present invention also relates to a vehicle comprising a body having a first central portion and first opposite end portions, a pair of first elongated links on each side of said body, each link of each pair having an inner end and an outer end, wheels mounted on said outer ends of said first elongated links, first pivot means mounting said inner ends of each of said pairs on said central portion of said body, spaced standard on said body located outwardly of said central portion of said body, a second elongated link associated with each of said standards, each second elongated link including a second central portion and second opposite end portions, second pivot means pivotally mounting each second elongated link on each standard and crosswise of said body, and coupling means extending between said second opposite end portions of said second elongated links and said outer ends of said first elongated links.

The present invention also relates to a vehicle comprising a body, elongated links having outer end portions, pivot means mounting said elongated links on opposite sides of said body for permitting said links to pivot as said vehicle traverses uneven terrain, wheels mounted on said outer end portions, and steering linkage means coupled between said body and said wheels for selectively applying a turning force to said wheels while permitting said links to pivot without imparting any substantial oscillatory movement to said wheels in response to such pivoting of said links.

The present invention also relates to a vehicle comprising a body, elongated links having outer end portions, pivot means mounting said elongated links on opposite sides of said body for permitting said links to pivot as said vehicle traverses uneven terrain, wheels mounted on said outer end portions, steering linkage means coupled between said body and said wheels for selectively applying a turning force to said wheels while permitting said links to pivot without imparting any substantial oscillatory movement to said wheels in response to such pivoting of said links, and means on said vehicle for imparting a positive drive to said wheels.

The various aspects of the present invention will be more fully understood when the following portions of the specification are read in conjunction with the accompanying drawings wherein:

BRIEF DESCRIPTION OF THE DRAWINGS

FIG. 3 is a plan view of the vehicle taken substantially in the direction of arrows 3—3 of FIG. 1;

FIG. 4 is a fragmentary cross sectional view taken substantially along line 4—4 of FIG. 1 and showing the drive to the wheels mounted on the outer sides of the bogies;

FIG. 5 is a fragmentary cross sectional view showing a modified drive arrangement;

FIG. 6 is a fragmentary cross sectional view taken substantially along line 6—6 of FIG. 5;

FIG. 7 is a diminutive side elevational view illustrating the action of the bogies as the vehicle traverses uneven terrain;

FIG. 8 is a front elevational view of the vehicle taken substantially in the direction of arrow 8—8 of FIG. 7;

FIG. 9 is a fragmentary cross sectional view taken substantially along line 9—9 of FIG. 8 and showing the attitude of the bogie and the wheels mounted thereon on the opposite side of the vehicle from the bogie shown in FIG. 7;

FIG. 10 is a cross sectional view taken subtantially along line 10—10 of FIG. 7 and showing the attitudes of the vehicle body and the bogie-mounted wheels;

FIG. 11 is an end elevational view of a modified embodiment of the present invention wherein the pivot for the equalizing link connecting bogies on opposite sides of the vehicle is floatingly mounted in a frame;

FIG. 12 is a fragmentary cross sectional view taken substantially along line 12—12 of FIG. 11;

FIG. 13 is a fragmentary cross sectional view taken substantially along line 13—13 of FIG. 12;

FIG. 14 is a side elevational view of a modified embodiment of the present invention showing the wheels mounted at outer ends of levers which have their inner ends pivotally mounted on the vehicle body;

FIG. 15 is a fragmentary cross sectional view taken substantially along line 15—15 of FIG. 14 and showing the drives to the wheels at the outer ends of the levers;

FIG. 16 is a fragmentary side elevational view of a suspension which is a modification of the suspension shown in FIGS. 1-3 and FIGS. 11-13;

FIG. 17 is an end elevational view taken substantially in the direction of arrows 17—17 of FIG. 16;

FIG. 18 is a fragmentary plan view taken substantially in the direction of arrows 18—18 of FIG. 16;

FIG. 19 is a fragmentary side elevational view of a vehicle having centrally pivoted bogies of the type described in the previous figures and also having a steering linkage for steering wheels mounted on the outer ends of the bogies;

FIG. 20 is a fragmentary end elevational view taken substantially in the direction of arrows 20—20 of FIG. 19;

FIG. 21 is a fragmentary plan view taken substantially in the direction of arrows 21—21 of FIG. 19;

FIG. 22 is a fragmentary plan view taken substantially in the direction of arrows 22—22 of FIG. 20;

FIG. 23 is a fragmentary cross sectional view taken substantially along line 23—23 of FIG. 19 and showing more details of the steering linkage;

FIG. 24 is a fragmentary cross sectional view taken substantially along line 24—24 of FIG. 23;

FIG. 25 is a diagrammatic view of the linkage corresponding to FIG. 19;

FIG. 26 is a diagrammatic view of the linkage corresponding to FIG. 20;

FIG. 27 is a diagrammatic view of the linkage corresponding to FIG. 21;

FIG. 28 is a diagrammatic view of the linkage corresponding to FIG. 22;

FIG. 29 is a fragmentary side elevational view of a vehicle having pivotal mounted bogies and also having another type of steering linkage for steering wheels mounted on the outer ends of the bogies;

FIG. 30 is a partially broken away end elevational view taken substantially in the direction of arrows 30—30 of FIG. 29;

FIG. 31 is a fragmentary cross sectional view taken substantially along line 31—31 of FIG. 29;

FIG. 32 is a fragmentary cross sectional view taken substantially along line 32—32 of FIG. 29;

FIG. 33 is a diagrammatic view corresponding to FIG. 29;

FIG. 34 is a diagrammatic view corresponding to FIG. 30;

FIG. 35 is a diagrammatic view corresponding to FIG. 35;

FIG. 36 is a diagrammatic view corresponding to FIG. 32;

FIG. 37 is a partially broken awa and partially cross sectional end elevational view of another embodiment of the present invention showing structure for positively driving a bogie mounted wheel which is steerable by the linkage of FIGS. 19-28;

FIG. 38 is a fragmentary cross sectional view taken substantially along line 38—38 of FIG. 37; and FIG. 39 is a fragmentary cross sectional view showing structure for positively driving a bogie mounted wheel of the type which is steerable by the linkage of FIGS. 29-36.

DESCRIPTION OF THE PREFERRED EMBODIMENTS

Figure 1:
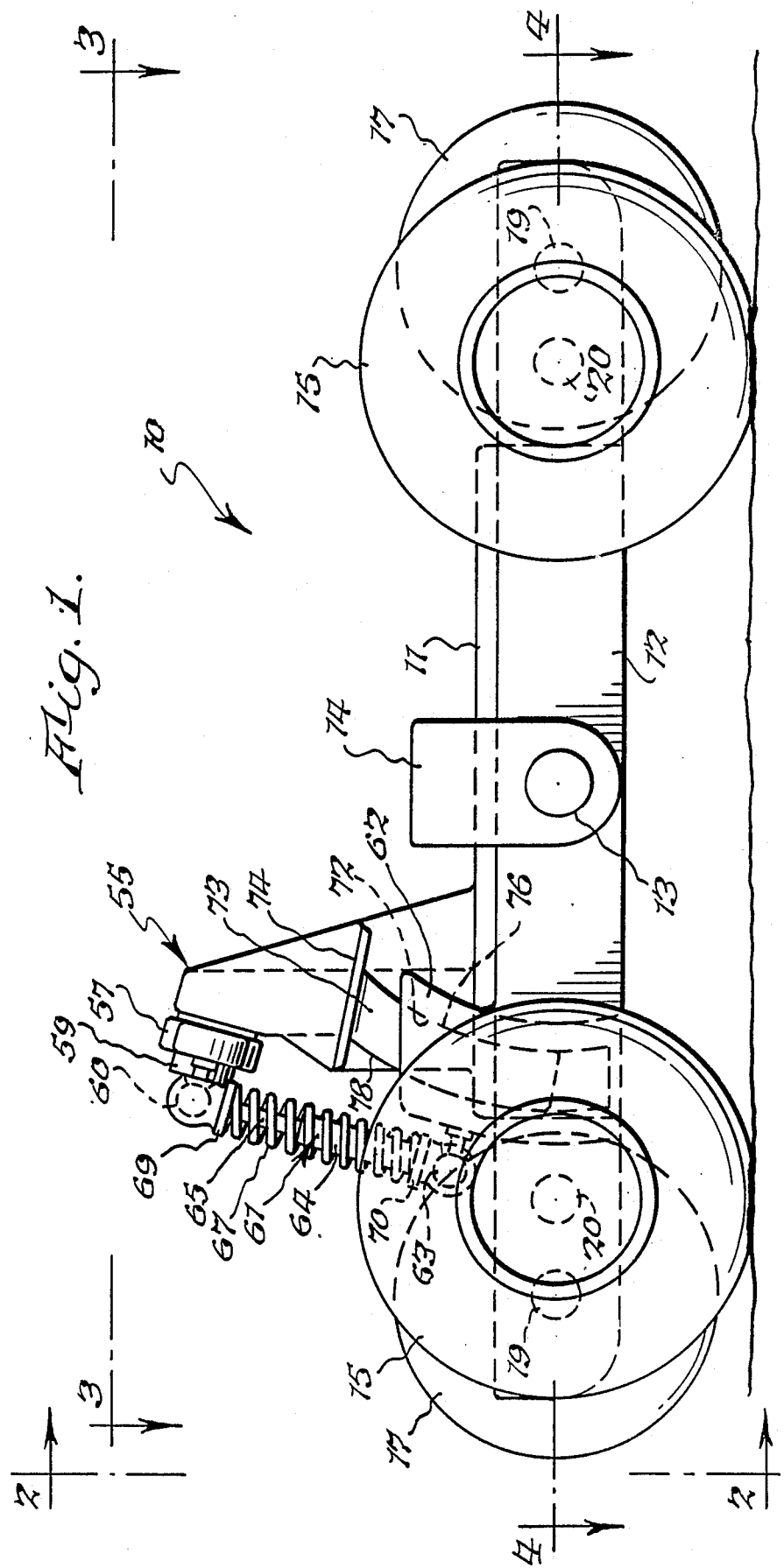
FIG. 1 is a side elevational view of the improved all-terrain vehicle of the present invention.

The all-terrain vehicle 10 of FIGS. 1-4 includes a vehicle body 11 having mirror-image bogies 12 and 12' mounted on pivot shafts 13 and 13', respectively, which extend outwardly from body 11 and which have their outer ends supported in frame members 14 and 14', respectively.

Main wheels 15 and 15' and auxiliary wheels 17 and 17' are mounted on the outer ends of bogies 12 and 12'. More specifically, outer wheels 15 and 15' are rotatably mounted at the outer ends of bogies 12 and 12', respectively, on the outer sides of the bogies. Inner wheels 17 and 17' are mounted on the outer ends of bogies 12 and 12', respectively, and are located on the inner sides of the bogies. Inner wheels 17-17' are of smaller diameter than outer wheels 15-15'. Furthermore, as can be seen from FIGS. 1-4, the axles 19 and 19' of wheels 17 and 17', respectively, are located further outwardly on bogies 12 and 12', respectively, than the axles 20 and 20', respectively, of wheels 15 and 15', respectively. Thus, wheels 17 and 17' extend further outwardly from the vehicle body than wheels 15 and 15', respectively.

The foregoing orientation of wheels 15, 17 and 15', 17' is of advantage in that there is generally sequential contact with foreign bodies encountered by the wheels. Under normal circumstances only main wheels 15–15' engage the ground. Wheels 17 and 17', which extend forwardly of wheels 15 and 15', respectively, are normally elevated above the ground and are out of contact therewith. However, when an obstacle is in the path of a pair of wheels, such as 15, 17, wheel 17 will generally engage the obstacle initially, followed by engagement of wheel 15 with such obstacle. Thus, there is less resistance to overcoming such obstacles than if wheels 15–17 and 15'–17' engaged such obstacles substantially simultaneously.

Figure 2:
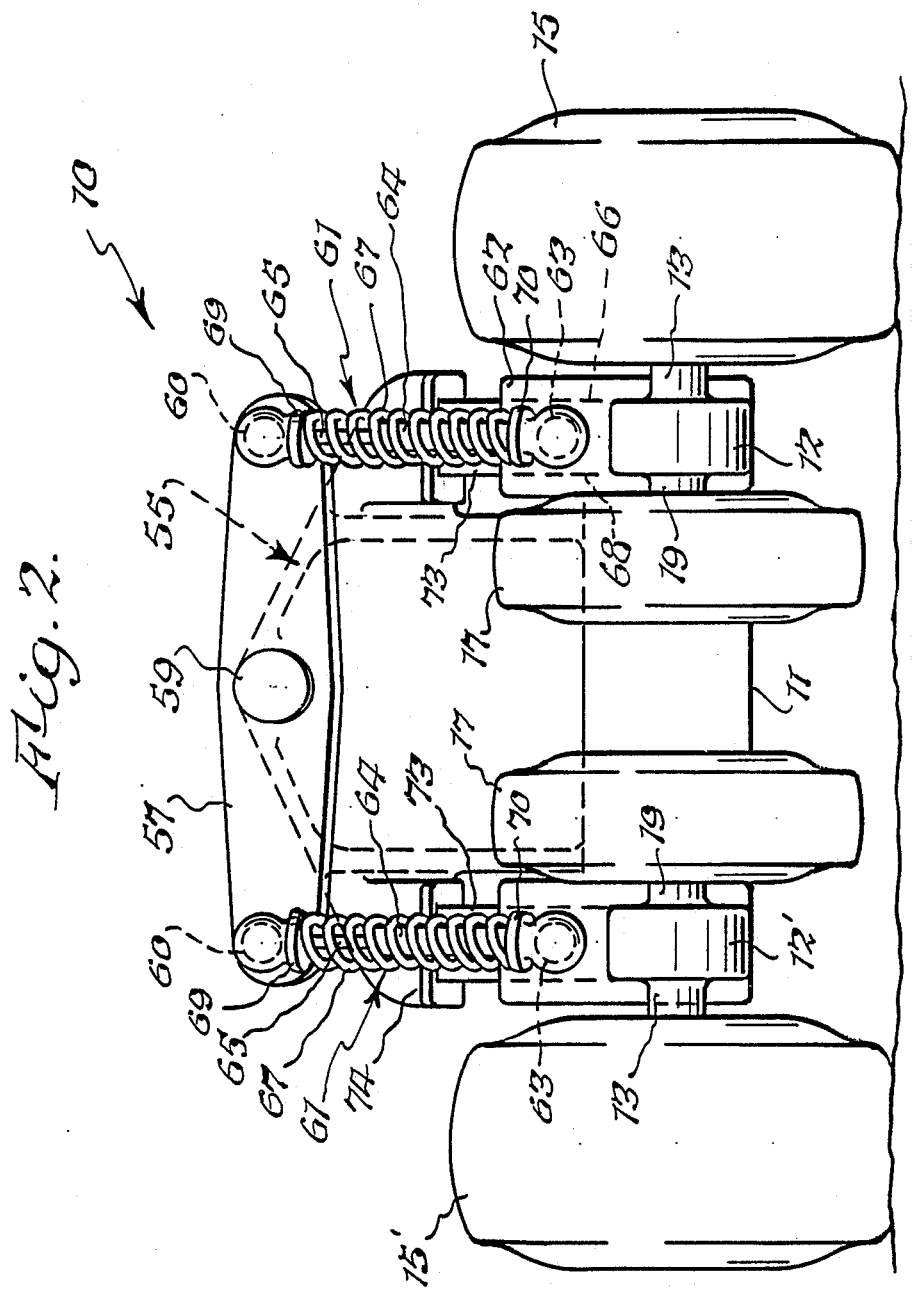
FIG. 2 is an end elevational view taken substantially in the direction of arrows 2—2 of FIG. 1.

Main wheels 15–15' are positively driven and smaller diameter auxiliary wheels 17–17' are mounted for idle rotation. Normally only larger diameter outer wheels 15 and 15' will engage the ground, as shown in FIGS. 1 and 2. However, if there should be an obstacle which causes each pair of wheels 15–17 or 15'–17' to engage an object simultaneously, they will both move over such object.

The drive for wheels 15 is depicted in FIG. 4. In this respect, the body 11 includes a main drive gear 21 which is suitably driven by an engine or other prime mover, not shown. Gear 21 is in mesh with a gear 22 which is keyed to shaft 23 having bevel gear 24 keyed thereto which is in mesh with bevel gears 25 and 27 keyed to the outer ends of torsion bars 29 and 30, respectively, which have bevel gears 31 and 32, respectively, keyed to the outer ends thereof which are in mesh with bevel gears 33 and 34, respectively, keyed to axle shafts 35 and 37, respectively, on which wheels 15 are mounted. A mirrorimage gearing arrangement (not shown) is also provided within bogie 12' for driving wheels 15'.

The torsion bars 29 and 30 permit relative rotational movement between the wheels at the outer ends of bogie 12 and thus contribute to maintaining good contact of the wheels with the ground without slippage inasmuch as the torsion bars 29 and 30 can twist to prevent wheel slippage with the ground or other objects. The same effect is obtained with the mirror image gearing in bogie 12'.

Figures 4A, 4B:
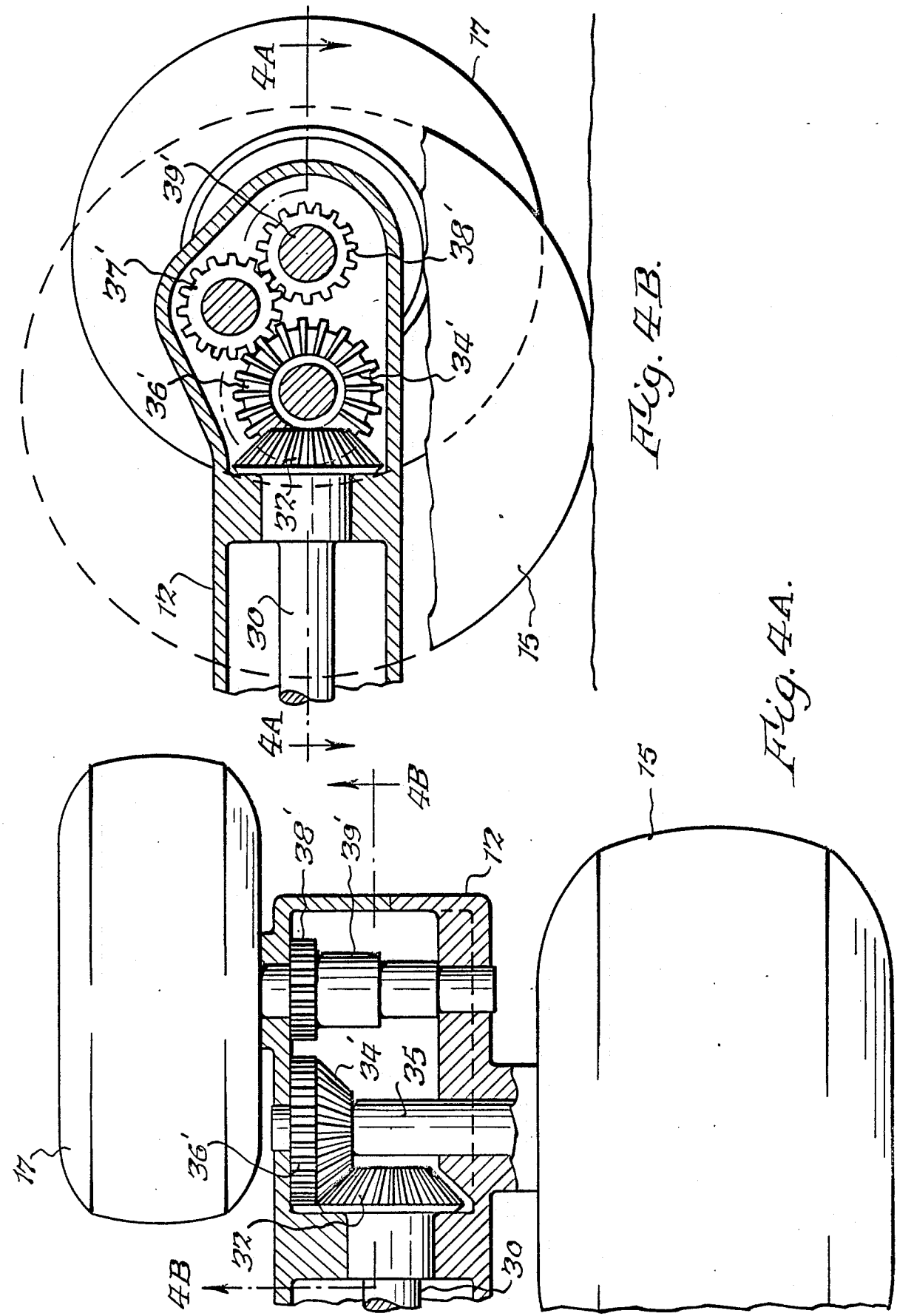
FIG. 4A is a fragmentary cross sectional view similar to FIG. 4 and taken substantially along line 4A—4A of FIG. 4B and showing an arrangement for positively driving both the main wheels and auxiliary wheels.
FIG. 4B is a fragmentary cross sectional view taken substantially along line 4B—4B of FIG. 4A.

In FIGS. 4A and 4B a modified embodiment is disclosed wherein there is a positive drive to both the outer wheels 15 and the inner wheels 17. In this respect, shaft 30, which is identical to shaft 30 of FIG. 4 and which is mounted in bogie 12, has bevel gear 32 mounted at the end thereof which is in mesh with a bevel gear 34' keyed to shaft 35' which is journalled in bogie 12. Shaft 35' drives wheel 15. A spur gear 36' is also keyed to shaft 35' and it is in mesh with idler gear 37' which is in mesh with gear 38' keyed to shaft 39' which is journalled in bogie 12 and which drives wheel 17. The ratios of gears 32, 34', 36' and 38' are such that auxiliary wheel 17 is driven at the same peripheral speed as main wheel 15.

An analogous arrangement is provided for driving wheels 15 and 17 at the outer end of the bogie 12 which houses torsion shaft 29 and which is also mounted on pivot 13. Mirror image gearing arrangements are also provided for both wheels 15' and both wheels 17' on the opposite side of the vehicle. The positive driving of all four main wheels 15—15' and all four auxiliary wheels 17–17' insures good contact without slippage of each pair of wheels 15–17 and 15'–17' when each such pair is in engagement with an obstacle. Normally only larger diameter outer wheels 15 and 15' will engage the ground, as shown in FIGS. 1 and 2. However, if there should be an obstacle which causes each pair of wheels 15–17 or 15'–17' to engage an object simultaneously, they will both move over such object without slippage inasmuch as they are driven at the same peripheral speeds. Furthermore, if any main wheel 15 or 15' is out of contact with the ground, or out of contact with an obstacle, its associated auxiliary wheel 17 or 17', respectively, will maintain driving contact with the obstacle.

A modified torsion bar drive is shown in FIGS. 5 and 6 which can be used with the embodiments of FIGS. 4 and 4A. In this embodiment a bogie 12a is fragmentarily shown, which for all practical purposes can be identical to bogies 12 and 12'. In FIG. 5 bevel gear 24 corresponds to bevel gear 24 of FIG. 4. Bevel gear 25 corresponds to bevel gear 25. In the embodiments of FIGS. 5 and 6 torsion bar 29a operates in the same manner as torsion bar 29 in the sense that it twists to permit relative rotational movement between the wheels at the outer ends of the bogie. However, end 42 of torsion bar 29a has a pin 43 extending therethrough which is received in sleeve 44. The opposite end 45 of torsion bar 29a has a pin 47 therein, the outer end 49 of which is located in cutaway 50 of sleeve 44. Thus, torsion bar 29a can twist without engaging the ends 51 of cutaway 50. However, the ends 51 will determine the limits of twisting motion of torsion bar 29a, and when pin 49 engages either end 51, torsion bar 29a can no longer twist, and thus when there is such engagement, there will be a positive drive through sleeve 44 in addition to the drive through torsion bar 29a.

The embodiment of FIGS. 1–4 includes two other features. One feature is the coupling of bogies 12 and 12' through a specialized linkage. The other feature is the structure for stabilizing the bogies 12 and 12' against lateral movement relative to the body 11. The structure for coupling bogies 12 and 12' to each other includes a frame or standard 55 which extends upwardly from the top surface of vehicle body 11. An elongated link 57 has its central por ion pivotally mounted on standard 55 by pivot 59. The outer ends of elongated link 57 mount ball joints 60 which are coupled to the upper ends of links 61. The lower ends of links 61 are coupled to members 62 and 62' on bogies 12 and 12', respectively, by ball joints 63. Links 61 are telescopic members which include lower portions 64 which slidably receive upper portions 65. Springs 67 encircle links 61 and bear on plates 69 and 70 associated with ball joints 60 and 63, respectively. Thus, springs 67 tend to bias links 64 and 65 to an extended position. Links 61 may be shock absorbers.

The operation of the connecting link 57 is depicted in FIGS. 7–10 wherein all numerals correspond to the numerals used in FIGS. 1–4. When wheel 15' (FIG. 8) is going over a portion of ground 69 which is elevated relative to portion 69', bogie 12' will pivot in a counterclockwise direction in FIG. 7 which will cause elongated link 57 to pivot in a clockwise direction in FIG. 8 which in turn will tend to move link 61 adjacent wheel 15 downwardly. However, wheel 15 cannot move downwardly, and thus the vehicle body 11 will tend to be raised, and this amount of raising is one-half of the amount that wheel 15' is raised in traveling over elevated ground portion 69. It will be understood that elongated link 57 and links 61 control the amount which bogies 12 and 12' pivot. Actually, therefore, the linkage 57, 61 correlates the relative pivotal motion between bogies 12 and 12'. Furthermore, because links 61 are spring-biased and telescopic, there can be a bit of relative yielding motion between bogies 12 and 12' to absorb abrupt shocks. In other words, if the forces on links 61 exceed the strength of springs 67, the latter will yield to permit members 64 and 65 to telescope.

Structure is also provided to reinforce bogies 12 against lateral deflection. As noted above, bogies 12 and 12' have members 62 and 62' formed integrally therewith, and such members are stabilizing sockets. Socket 62' is the mirror image of socket 62 and therefore only socket 62 will be described. However, socket 62' will include primed numerals which correspond to the unprimed numerals of socket 62. Stabilizing socket 62 includes an arcuate opening 72 which lies on a circumference of a circle having pivot 13 as its center. An elongated arcuate arm 73 has its upper end 74 firmly affixed to standard 55. Arcuate arm 73 is received in complementary mating relationship within socket 72 of stabilizing member 62. Arm 73 also has outer edge portions which lie on circumferences 76 and 78 having pivot 13 at their center. Furthermore, the opposite sides 66 and 68 (FIG. 3) of arm 73 are in engagement with the contiguous abutting sides of socket 62. Thus, as bogie 12 pivots clockwise and counterclockwise about its pivot 13, arm 73 will enter and leave socket 72 of stabilizing member 62. The same action occurs between arm 73' and stabilizing socket 62' associated with bogie 12'. Thus, lateral movement of bogies 12 and 12' is controlled by the stabilizing structure 72–73 and 72'–73'. It will be appreciated that the mating surfaces of arm 73 and socket 72 should be of suitable bearing material to permit free relative movement without binding.

In FIGS. 11–13 a modified structure is shown for linking bogies 12 and 12'. The auxiliary wheels 17, 17' have not been shown in these figures, but it will be understood that they can exist in the same manner described relative to the preceding figures. In the embodiment of FIGS. 11–13 an elongated link 57a corresponds to link 57 of the preceding figures. It is mounted on a pivot 73 which is carried in slide 74 within frame or standard 75. Upper spring 77 and lower spring 79 bear on opposite sides of slide 74, and the outer ends of springs 77 and 79 bear against adjacent portions of frame 75. Thus, pivot 73, which is mounted in slide 74, is biased by springs 77 and 79 to a central neutral position. Rigid links 80 and 80' extend between the outer ends of elongated link 57a and bogies 12 and 12', respectively. First ball joints 81 are located between the upper ends of rigid links 80 and 80' and elongated link 57a. Ball joints 82 exist between the lower ends of links 80 and 80' and bogies 12 and 12', respectively. Thus, there can be universal movement between the outer ends of links 80 and 80' and the members to which they are attached. Therefore, as in the previous embodiment, as one of the bogies 12 or 12' rises or falls, a falling or rising, respectively, will be transferred to the other of the bogies 12 or 12' through links 80, 80' and 57a. However, any abrupt shocks will be absorbed by springs 77 and 79 which permit slide 74 to move vertically within frame 75 and thus carry pivot 73 with it. Shock absorbers not shown may be associated with springs 77 and 79.

In FIGS. 14 and 15 a still further embodiment of the present invention is disclosed. In this embodiment the wheels at opposite ends of the vehicle body are mounted on the outer ends of levers, the inner ends of which are pivotally mounted on the vehicle body. More specifically, levers 85 and 87 have their inner ends pivotally mounted on shaft 89. Wheels 90 and 91 are mounted on the outer ends of levers 85 and 87, respectively. While only one side of the vehicle 86 is shown, it will be appreciated that the opposite side has mirror image counterparts of levers 85 and 87 and wheels 90 and 91 and their associated structure which will be described hereafter.

The outer ends of levers 85 and 87 are supported by suitable structure similar to that described above relative to FIGS. 1–13. More specifically, a standard or frame 55a is located on the left side of the vehicle, and it pivotally mounts an elongated link 57a which has links 61a extending downwardly from the opposite ends of elongated link 57a. The lower end of one elongated link 61a is affixed by means of a ball joint 63a to the stabilizer housing 62a which forms a part of lever 87. The opposite side of the vehicle 86 includes a stabilizing housing which is the mirror image of stabilizing housing 62a, and it is mounted on the counterpart of elongated lever 87. The numerals with the letter suffix "a" depict structure which is analogous to structure bearing the same numerals without suffixes shown in FIGS. 1–13. An elongated arm 73a extends downwardly from frame or standard 55a and is received in complementary mating sliding relationship in the opening 72a of stabilizing housing 62a as described above relative to FIGS. 1–4.

The structure for supporting the outer end of lever 85 and its corresponding lever, not shown, on the opposite side of the vehicle, is mounted on the right end of body 88. It is essentially the mirror-image counterpart of such structure shown on the left end of the vehicle in FIG. 14. Therefore, an additional description will be omitted, but the corresponding elements of structure will be designated by the same numeral except that they will have the suffix "b" rather than "a" and they will correspond to their counterpart numerals which are designated with the suffix "a".

The basic difference between the embodiment of FIGS. 1–13 and the embodiment of FIGS. 14–15 is that each of the four wheels on vehicle 86 is independently suspended whereas in the embodiment of FIGS. 1–4 the wheels on each side of the vehicle are mounted at the ends of a bogie. Thus, in the embodiment of FIGS. 1–4, when a bogie on one side of the vehicle pivots, both wheels at opposite ends thereof, will move. In contrast, in the embodiment of FIGS. 14 and 15, wheel 90 will move independently of wheel 91 inasmuch as each wheel is mounted on its own lever 85 and 87, respectively. However, there will be a related movement between lever 85 and its counterpart on the opposite side of the vehicle because of the linkage which joins these levers, this linkage being designated in its entirety by numeral 93b. The same is true relative to lever 87 and its counterpart on the opposite side of the vehicle where the movement of one lever is transferred to the corresponding lever on the opposite side of the vehicle through the coupling linkage which is designated by the general numeral 93a.

Each wheel of the vehicle 86 is independently driven through the gear train disclosed in FIG. 15. In this respect, only the drive to wheels 90 and 91 will be described, and it will be understood that a corresponding drive train exists for the corresponding wheels on the opposite side of the vehicle. More specifically, a gear 95 is driven by the vehicle engine, and it is in mesh with gear 97 keyed to shaft 99 which also has bevel gears 100 and 101 keyed thereto. Gear 100 is in mesh with bevel gear 102 which is keyed to the end of torsion bar 103 which has bevel gear 104 keyed to the end thereof which is in mesh with bevel gear 105 keyed to shaft 106 which is the axle for wheel 90. Torsion bar 103, as shown, is housed within lever 85 which is pivotally mounted on portions 107 and 109 of shaft 99.

Wheel 91 is driven in the following manner. A bevel gear 110 is keyed to shaft 111, and it is in mesh with bevel gear 101. A gear 112 is also keyed to shaft 111 and it is in mesh with idler gear 113 which is in mesh with gear 114 which is keyed to torsion bar 115 which has a bevel gear 117 keyed to the other end thereof which is in mesh with bevel gear 119 keyed to axle shaft 120 journalled in the outer end of lever 87. Lever 87 has a portion 121 journalled in vehicle body 88 and it has a portion 122 journalled in arm 14a. Shaft portion 107 is journalled in lever portion 121, and the outer end of shaft 109 is journalled in lever portion 122. The spaced sides (not numbered) of the inner end of lever 85 are pivotally mounted on shaft 109. Thus, levers 85 and 87 can pivot independently of each other on shaft 109 while positive drives are transmitted therethrough to wheels 90 and 91.

The structure of vehicle 86 of FIGS. 14 and 15 provides high ground clearance to the vehicle body 88 for two reasons, namely, that there is no drive linkage below the vehicle chassis and further because the links 85 and 87 extend downwardly from their pivot 89.

While the embodiment of FIGS. 14 and 15 has shown only single wheels mounted at the outer ends of the levers, it will be appreciated that double wheels, such as shown in FIGS. 1–4, can be mounted on the outer ends of the levers, and, further, the double wheels may be positively driven as shown in FIGS. 4A and 4B.

In FIGS. 16–18 a modified linkage is shown for coupling bogies 131 and 132 which correspond to bogies 12 and 12' of FIGS. 1–3 which are pivotally mounted at their central portions on opposite sides of vehicle body 133 and which have wheels 134 and 135, respectively, mounted on the outer ends thereof. A standard 137 extends upwardly from vehicle body 133 The structure for linking bogies 131 and 134 includes a link 139 pivotally mounted at 140 on standard 137. Elongated links 141 and 142 have their upper ends pivotally mounted, as by ball joints, at the outer ends of link 39 at 143 and 144, respectively, and their lower ends pivotally mounted, as by ball joints, to bogies 131 and 132, respectively, at 145 and 147, respectively. Shock absorber type of bumpers 149 and 150 are mounted on standard 137 and their pistons 151 and 152, respectively, act as stops to define the limits of pivotal movement of link 139, as depicted by dotted lines in FIG. 17. The difference between the embodiment of FIGS. 16–18, on one hand, and the embodiments of FIGS. 1–3 and FIGS. 11–13, on the other hand, is that there is no spring mounting associated with the structure of FIGS. 16–18 whereas the other structures do have spring mountings.

In FIGS. 19–28 a steering linkage is disclosed for steering the vehicle wheels at the outer ends of centrally pivoted bogies, or at the outer ends of links, such as shown in FIG. 14. While the steering linkage is shown as being associated only with one wheel at the outer end of one bogie, it will be appreciated that the linkage also steers the corresponding wheel on the bogie on the opposite side of the vehicle, so that both wheels turn in the same direction in unison. In addition, while the steering linkage is shown as steering only one wheel at the outer end of the bogie, it will be appreciated that it can be extended to the wheel on the opposite end of the same bogie so that both such wheels turn in unison.

Bogie 155, which is of the type such as bogie 12 of FIG. 1, is centrally pivotally mounted on vehicle body 157 at 159. Wheel 160 is rotatably mounted on axle 161 which is mounted on kingpin sleeve 171 and which extends perpendicularly to kingpin 162 which has its ends 163 and 164 pivotally mounted in spaced ears 165 and 167, respectively, of kingpin bracket 169 which is pivotally mounted on the outer end of bogie 155 by cylindrical shaft 170 which forms an integral extension of bracket 169 and is coaxial with axle 161. Kingpin sleeve 171 is pivotally mounted on kingpin 162, and an arm 172 is fixedly secured to sleeve 171.

The steering linkage of FIGS. 19–28 causes the wheel 160, and its corresponding wheel (not shown) on the corresponding bogie (not shown) mounted on the opposite side of the vehicle, to maintain its same relative position to bogie 155 as the latter pivots about its axis 159 unless the vehicle is actually being steered. In other words, the pivotal action of bogie 155 about its axis 159 will not cause wheel 160 to oscillate back and forth about the axis of kingpin 162 as bogie 155 pivots. The only time that wheel 160 will be turned is when it is actually being steered by the manipulation of the vehicle steering wheel 173 (FIG. 23) which is keyed to gear 174 which is in mesh with toothed portion 175 of link 177 which is pivotally mounted on the vehicle body 157 at 179.

In order to prevent wheel 160 from oscillating as bogie 155 pivots, a linkage is provided which is essentially a parallelogram in nature. More specifically, a first elongated link 180 has one end pivotally connected by a pinned joint 181 (FIG. 19) to standard 182 (FIGS. 19 and 24). The opposite end of link 180 is pivotally connected by a pinned connection at 183 (FIGS. 19, 20 and 22) to the upper end of kingpin bracket 169 which is pivotally mounted on bogie 155 by shaft 170. Thus, as can be seen from FIG. 25, as bogie 155 pivots between positions 155a and 155b, link 180 will assume positions 180a and 180b, respectively. Thus, considering that link 180 is parallel to the longitudinal axis of bogie 155 when the latter is horizontal, and further considering that the spacing of pivot 181 from the axis of pivot 159 is equal to the vertical spacing between pivot 183 and the common axis of shaft 170 and wheel axle 161, position 180a will be parallel to position 155a and position 180b will be parallel to position 155b. In other words, the longitudinal axis of link 180 will always remain parallel to the longitudinal axis of bogie 155 in all positions of the latter. This will result in kingpin 162 always remaining in a vertical attitude in all pivotal positions of bogie 155.

A steering link 185 has one end pivotally mounted by means of a ball joint 187 to steering link 177 and its other end pivotally mounted by ball joint 189 to arm 172 which extends outwardly from kingpin sleeve 171. As can be seen from FIGS. 19 and 25, when the longitudinal axis of bogie 155 is horizontal, the longitudinal axes of links 180 and 185 will also be horizontal. Furthermore, when bogie 155 is horizontal, the axes of bogie pivot 159, pivot 181, and ball joint 187 will be on the same vertical line. Furthermore, the axes of axle 161, pivot 183 and ball joint 189 will also be on the same vertical line. The length of link 180 between its pivots is equal to the length of link 185 between its pivots, and these lengths are equal to the length of bogie 155 between the axis of pivot 159 and the common axis of shaft 170 and axle 161. Thus, there is a parallelogram linkage so that as bogie 155 oscillates back and forth about its axle 159, the longitudinal axes of bogie 155, link 180 and link 185 will always remain parallel. Accordingly, when bogie 155 and link 180 are in the positions 155a and 180a, respectively, link 185 will be in the position 185a, and when bogie 155 and link 180 are in the positions 155b and 180b, respectively, link 185 will be in the position 185b. The foregoing being the case, as bogie 155 oscillates about its pivot 159, wheel 160 will not oscillate about the axis of kingpin 162. The foregoing is true for all positions of bogie 155 and links 180 and 185.

Whenever it is desired to steer the vehicle, that is, to cause wheel 160 to move between positions 160a and 160b, (FIGS. 21, 27 and 28) steering wheel 173 (FIG. 23) is turned to move steering link 177 between positions 177a and 177b, respectively (FIG. 27), to cause the ball joint 187 at the outer end thereof to move to its dotted line positions 187a and 187b, respectively, and to cause ball joint 189 to move between positions 189a and 189b, respectively. In FIG. 25, position 187a is shown for position 180a of the bogie, and position 187b is shown for position 180b of the bogie. Analogous movements occur for all positions of the steering link 177 and bogie 180. The oscillation of bogie 155 about its pivot 159 will not feed back any motion to steering link 177. Thus, wheel 160 can be turned while bogie 155 is pivoting. It will be appreciated that a wheel (not shown) corresponding to wheel 160 is mounted on the outer end of a bogie (not shown) corresponding to bogie 155, and a mirror image linkage system corresponding to links 180 and 185 and their pivots are located on the opposite side of vehicle body 157. The link corresponding to link 185 is connected to the opposite side of link 177.

It will be appreciated that the steering linkage of FIGS. 19-28 does not preclude the mounting of inner wheels on the inner sides of the bogies, as shown in FIGS. 1-4. However, such inner wheels need not necessarily be steerable because they are normally out of contact with the ground. If desired, however, suitable linkages can be applied to such inner wheels to make them steerable, and such linkages could include links which are analogous to those shown.

In FIGS. 29-36 there is disclosed another linkage for steering wheels mounted on the outer ends of pivotal links or bogies. In this embodiment bogie 190 is pivotally mounted at 191 on vehicle body 192. A corresponding bogie 190' (FIG. 32) is pivotally mounted on the opposite side of vehicle body 192. Wheel 193 is rotatably mounted on axle 194 which has its inner end rigidly secured to kingpin sleeve 195 which is pivotally mounted on kingpin 197 having its opposite ends 199 and 200 mounted in ears 201 and 202, respectively, of kingpin bracket 203 which is rigidly affixed to bogie 190. A steering arm 204 has its end rigidly affixed to sleeve 195 at 205. A ball joint 207 connects the outer end of steering arm 204 to elongated link 209, the opposite end of which is connected by ball joint 210 to arm 211 which is a rigid extension of planet gear 212 which is pivotally mounted on shaft 213 which extends downwardly from steering link 214 which is pivotally mounted on shaft 216 secured between plate 218 and block 217. Bolts 215 secure block 217 and plate 218 to vehicle body 192. A link 220 has one end pivotally secured to bogie 190 by ball joint 221 and has its opposite end pivotally secured to shaft 213 (FIG. 32) by means of ball joint 222.

The steering mechanism operates in the following manner. First of all, unless steering wheel 223 (FIG. 31), which drives shaft 224 to which gear 225 is keyed, is actuated, the wheel 193 will not be turned, notwithstanding that bogie 190 pivots around its axis 191. In this respect, as bogie 190 pivots about its axis 191, link 209 will pivot about ball joint 210 and link 220 will pivot about ball joint 222. Thus, as bogie 190 pivots upwardly to position 190a, link 209 will move to position 209a and link 220 will pivot to position 220a (FIG. 33). Actually, when the steering arm is stationary relative to bogie 190, which is the case when wheel 193 is not being turned, ball joint 207 pivots about the axis of pivot 191 as a center because it has to remain fixed relative to the bogie, and ball joint 221 also pivots about the axis of pivot 191 as a center because it is fixed relative to the bogie. However, since pivot 210 is mounted at the end of member 211, the latter has to move to the left in FIG. 31 to position 210a if the wheel 193 is not to be turned. The linkage permits this without moving the steering wheel 223 and without causing the axle 194 to oscillate. In this respect, the pivotal motion of bogie 190 is no transmitted to steering wheel 223 because of the existence of link 220 which moves link 214 in a clockwise direction in FIG. 36 as bogie 190 pivots counterclockwise in FIGS. 29 and 33. However, the planetary gearing 229, 228, 212 mounted on link 214 is a structure which causes member 211, which is an extension of planet gear 212, to pivot in a counterclockwise direction about its axis 213 as steering link 209 moves to the left in FIG. 31 while link 214 pivots clockwise in FIG. 31 without transmitting such motion to sun gear 229 and thus not to steering wheel 223. More specifically, as link 220 pivots upwardly in FIG. 29 with bogie 190 so that its pivot 221 moves to the position 221a in FIG. 33, it causes plate 214 to pivot in a clockwise direction (FIG. 31) about its shaft 216 considering that it is journalled thereon. However, at this time gear 225, keyed to shaft 224, is being held stationary by steering wheel 223 because no steering is desired. Therefore, sun gear 229, which is journalled on shaft 216, will also remain stationary. However, since plate 214 is being moved to the left to position 214a (FIG. 36), member 211 will move to a parallel position 211a (FIG. 36) an amount a' which is substantially equivalent to the amount which pivot 207 of link 209 moves to the left (FIG. 33). In other words, the linkage causes member 211 to which the left end of link 209 is connected to move the same amount to the left as pivot 207 moves to thereby not cause lilnk 209 to turn axle 194. Thus, link 209 does not cause steering arm 204 to pivot axle 194 about the axis of kingpin 197. The same result is obtained when bogie 190 pivots downwardly from position 190 to position 190b. At this time, link 209 will pivot to the position 209b from its previous position 209. If wheel 193 is to be maintained straight in the direction of arrow 227, the connection at pivot 210 cannot cause axle 194 to oscillate, and further should not cause sun gear 223 to oscillate. However, pivot 210 does move to the right an amount b' to position 210b as bogie 190 pivots clockwise (FIG. 33). The gear arrangement permits pivot 210 to move to the right to the position 210b (FIGS. 33 and 36) without imparting motion to steering wheel 223 or causing axle 194 to turn. In this respect, as bogie 190 pivots clockwise (FIG. 33) to the position 190b, link 220 attached thereto will move to position 220b and rotate plate 214 to which it is attached to position 214b (FIG. 36). However, since sun gear 229 is held stationary by gear 225 which is held stationary by steering wheel 223, as plate 214 moves to the position 214b, idler gear 228 will walk around gear 229 and cause member 211 to move to the position 21lb. Thus, member 211 will have moved a distance b' (FIG. 36) which is substantially equivalent to the distance that pivot 207 of link 209 has moved to the right to position 207b, and thus link 209 will not turn steering arm 204.

When it is desired to steer the vehicle, steering wheel 223 (FIG. 31) is turned to turn gear 225 which turns sun gear 229 which rotates idler gear 228 which in turn rotates planet gear 212. However, at this time plate 214 is held stationary, assuming that bogie 190 is not pivoting, so that the turning of planet gear 212 will drive steering link 209 to turn the wheel 193. However, if bogie 190 is pivoting at the same time wheel 223 is being turned, then the above-mentioned compensatory linkage will also operate to maintain wheel 193 in the direction to which steering wheel 223 has turned it. The pivotal movement of planet gear 212 for steering the wheels is schematically demonstrated in FIG. 36. In FIGS. 33 and 36 corresponding positions of the various links and pivot points are designated by the suffixes "a" and "b".

While the foregoing description has been directed primarily to the linkages on the side of the vehicle shown in FIGS. 29–31, it will be appreciated that a mirror image structure exists on the opposite side of the vehicle. Thus, for example, there are links on the opposite side of the vehicle which correspond to links 209 and 220 and also to link 214, and it is to be noted that link 214 is pivotally mounted on shaft 216. Planet gear 212' is pivotally mounted on shaft 213', and idler gear 228' is pivotally mounted on shaft 213' which is in mesh with sun gear 229. In this respect, for example, in FIGS. 32 and 36 portions of the steering linkage including link 214 and the planetary gearing which correspond to structure which is identified with unprimed numerals is designated by primed numerals. Thus, the linkage on the opposite side of the vehicle permits bogies 190 and 190' (FIG. 32) to each pivot without causing the wheels mounted thereon to oscillate and without transmitting movement to the steering wheel 223, while still permitting the wheels to be steered in all pivoted positions of the bogies 190 and 190'.

It will be appreciated that the steering linkage of FIGS. 29–36 does not preclude the mounting of inner wheels on the inner sides of the bogies, as shown in FIGS. 1–4. However, such inner wheels need not necessarily be steerable because they are normally out of contact with the ground. If desired, however, suitable linkages can be applied to such inner wheels to make them steerable, and such linkages could include links which are analogous to those shown.

In FIGS. 37 and 38 a further modification of the present invention is disclosed wherein a positive drive is provided for a wheel such as 160 of FIGS. 19–28. As noted above, the kingpin bracket 169 has a portion 170 which is pivotally mounted in bogie 155. In this embodiment, the wheel axle 161a, which corresponds to axle 161 of FIGS. 19–28 is mounted in bearing 240 in kingpin portion 241 which has pivots 242 and 243 pivotally mounted in kingpin bracket 169. A shaft 244 is located within bogie 155 and is suitably driven from a remote position through a suitable drive such as disclosed in FIG. 4. A bevel gear 245 is keyed to the end of shaft 244 which is journalled at 247. Bevel gear 245 is in mesh with bevel gear 249 which is fixed to the end of axle extension 250 journalled at 251 in kingpin bracket 169. Axle 161a and axle extension 250 are joined by a RZEPPA connection 252 which permits kingpin portion 241 to pivot in kingpin bracket 169 while a positive drive is maintained to wheel 160. As noted above, kingpin bracket 169 pivots within bogie 155 by virtue of pivot 170. However, pivot 170 is cutaway at 253 so that it will not contact with boss 254 in which the end of shaft 244 is journalled.

In FIG. 39 a fragmentary cross sectional view is shown of a positive drive to a wheel such as 193 of FIGS. 29–36. In this embodiment, the kingpin bracket 203 does not pivot relative to bogie 190. Therefore, the above-described clearance at 253 of FIG. 38 is not required. Thus, an axle extension such as 250 can be mounted directly in a bearing 255, and no clearance is required which corresponds to clearance 253 of FIG. 38. A bevel gear 257 is mounted at the end of a shaft such as 244, and it is in mesh with a bevel gear 259 which is affixed to the end of axle extension 250. The remainder of the drive to a wheel such as 193 of FIGS. 29–36 can be identical to that shown above in FIG. 37 with the specialized kingpin portion 241 and the RZEPPA connection 252.

In the foregoing description references were made to both bogies and links (FIGS. 14, 15), and it will be appreciated that the term links includes bogies.

It can thus be seen that the various structures of the present invention are manifestly capable of achieving the above-enumerated objects and while preferred embodiments of the present invention have been disclosed, it is not limited thereto but may be otherwise embodied within the scope of the following claims:

What is claimed is:

1. A vehicle comprising a body, elongated links having outer end portions, pivot means mounting said elongated links on opposite sides of said body with said outer end portions extending beyond said body, inner and outer sides on said elongated links, a main wheel mounted outwardly of said outer side of each of said end portions of said elongated links, an auxiliary wheel mounted inwardly of said inner sides of each of said elongated links, and said auxiliary wheels on said links extending further outwardly away from said body than said main wheels to thereby engage an obstruction in the path of both in advance of the other.

2. A vehicle as set forth in claim 1 wherein said orientation exists between all of said main wheels and all of said auxiliary wheels.

3. A vehicle as set forth in claim 1 wherein said main wheels are of greater diameter than said auxiliary wheels.

4. A vehicle as set forth in claim 1 including means for driving said main wheels and said auxiliary wheels at substantially the same peripheral speed.

5. A vehicle as set forth in claim 4 wherein said main wheels are of larger diameter than said auxiliary wheels.

6. A vehicle as set forth in claim 1 wherein said outer end portions at opposite ends of each of said links extend outwardly beyond said body, and wherein said main wheels are mounted on said outer sides of said end portions, and wherein said auxiliary wheels are mounted on said inner sides of said end portions.

7. A vehicle as set forth in claim 6 wherein said main wheels are of greater diameter than said auxiliary wheels.

8. A vehicle as set forth in claim 6 including means for driving said main wheels and said auxiliary wheels at substantially the same peripheral speed.

9. A vehicle as set forth in claim 6 including means coupled between said body and said elongated links for stabilizing said elongated links against lateral deflection.

10. A vehicle as set forth in claim 9 wherein said last-mentioned means comprise a socket on each of said links, and an arm secured to said body for being movably received in each of said sockets.

11. A vehicle as set forth in claim 10 wherein each of said arms are arcuate and lie on a circumference with said pivot means as a center, and wherein each of said sockets are of complementary mating configuration to said arcuate arms.

12. A vehicle as set forth in claim 1 including means coupled between said body and said elongated links for stabilizing said elongated links against lateral deflection.

13. A vehicle as set forth in claim 12 wherein said last-mentioned means comprise a socket on each of said links, and an arm secured to said body for being movably received in each of said sockets.

14. A vehicle as set forth in claim 13 wherein each of said arms are arcuate and lie on a circumference with said pivot means as a center, and wherein each of said sockets are of complementary mating configuration to said arcuate arms.

15. A vehicle as set forth in claim 9 including a frame on said body, an elongated member having opposite ends and a central portion, second pivot means pivotally mounting said central portion of said elongated member on said frame with said elongated member extending crosswise of said body, and link means having first and second opposite ends, first means movably mounting said first opposite ends on said opposite ends of said elongated member, and second means movably mounting said second opposite ends on said elongated links on opposite sides of said body.

16. A vehicle as set forth in claim 15 wherein said first and second means comprise ball joints.

17. A vehicle as set forth in claim 15 wherein said elongated members comprise telescopic links, and spring means biasing said telescopic links to extended positions.

18. A vehicle as set forth in claim 17 wherein said first and second mean comprise ball joints.

19. A vehicle as set forth in claim 9 including spring means coupled between said frame and said second pivot means for permitting vertical floating movement of said second pivot means on said body.

20. A vehicle as set forth in claim 19 wherein said first and second means comprise ball joints.

21. A vehicle as set forth in claim 20 wherein said elongated members are rigid links.

22. A vehicle comprising a body, first elongated links each having a first central portion and first outer end portions, first pivot means pivotally mounting said first central portions of said first elongated links on opposite sides of said body, wheels mounted on said first outer end portions of said elongated links, a standard on said body, a second elongated link having a second central portion and second outer end portions, second pivot means pivotally mounting said second central portion on said standard with said second elongated link extending crosswise of said body, third elongated links having first and second ends, first connecting means movably connecting said second outer end portions of said second elongated link to said first ends of said third elongated links, and second connecting means movably connecting said first outer ends of said first elongated links to said second ends of said third elongated links.

23. A vehicle as set forth in claim 22 wherein said first and second connecting means are ball joints.

24. A vehicle as set forth in claim 23 wherein said third elongated links are telescopic.

25. A vehicle as set forth in claim 24 including spring means for biasing said telescopic third elongated links to extended positions.

26. A vehicle as set forth in claim 22 including means for floatingly mounting said second pivot means on said standard for vertical movement.

27. A vehicle as set forth in claim 26 wherein said first and second connecting means are ball joints.

28. A vehicle as set forth in claim 27 wherein said third elongated links are rigid members.

29. A vehicle as set forth in claim 22 including stabilizing means coupled between said body and said first elongated links for stabilizing said first elongated links against lateral movement.

30. A vehicle as set forth in claim 29 wherein said stabilizing means comprise arms coupled to said body, and sockets on said first elongated links for movably receiving said arms.

31. A vehicle as set forth in claim 30 wherein said arms are arcuate and lie on a circumference of a circle with said first pivot means at its center, and wherein said sockets receive said arms in substantially complementary mating relationship.

32. A vehicle comprising a vehicle body, elongated links, wheels mounted on said elongated links, pivot means pivotally mounting said elongated links on opposite sides of said body, and stabilizing means coupled between said elongated links and said body for stabilizing said elongated links against lateral deflection.

33. A vehicle as set forth in claim 32 wherein said stabilizing means comprise arms coupled to said body, and sockets on said first elongated links for movably receiving said arms.

34. A vehicle as set forth in claim 33 wherein said arms are arcuate and lie on a circumference of a circle with said pivot means at its center, and wherein said sockets receive said arms in substantially complementary mating relationship.

35. A vehicle comprising a body having a first central portion and first opposite end portions, a pair of first elongated links on each side of said body, each link of each pair having an inner end and an outer end, wheels mounted on said outer ends of said first elongated links, first pivot means mounting said inner ends of each of said pairs on said central portion of said body, spaced standards on said body located outwardly of said central portion of said body, a second elongated link associated with each of said standards, each second elongated link including a second central portion and second opposite end portions, second pivot means pivotally mounting each second elongated link on each standard and crosswise of said body, and coupling means extending between said second opposite end portions of said second elongated links and said outer ends of said first elongated links.

36. A vehicle as set forth in claim 35 wherein said coupling means comprise third elongated links.

37. A vehicle as set forth in claim 36 wherein said third elongated links have outer ends, and wherein said coupling means include ball joints at said outer ends of said third elongated links.

38. A vehicle as set forth in claim 37 wherein said third elongated links are telescopic.

39. A vehicle as set forth in claim 38 including spring means for biasing said third telescopic elongated links to extended conditions.

40. A vehicle as set forth in claim 35 including means for floatingly mounting said second pivot means for vertical movement on said standard.

41. A vehicle as set forth in claim 40 wherein said coupling means comprise third elongated links, and wherein said third elongated links are rigid links.

42. A vehicle as set forth in claim 41 wherein said third elongated links have outer ends, and wherein said coupling means include ball joints at said outer ends of said third elongated links.

43. A vehicle comprising a body, elongated links having outer end portions, pivot means mounting said elongated links on opposite sides of said body for permitting said links to pivot as said vehicle traverses uneven terrain, wheels mounted on said outer end portions, and steering linkage means coupled between said body and said wheels for selectively applying a turning force to said wheels while permitting said links to pivot without imparting any substantial oscillatory movement to said wheels in response to such pivoting of said links.

44. A vehicle as set forth in claim 43 wherein each of said wheels is mounted on an axle and wherein said steering linkage for at least one wheel includes a kingpin, a kingpin bracket mounting said kingpin on said elongated link, a kingpin sleeve pivotally mounted on said kingpin, said axle being mounted on said sleeve, a steering arm extending outwardly from said kingpin sleeve, second pivot means pivotally mounting said kingpin bracket on said elongated link, a second elongated link, a first end on said second elongated link, first connecting means connecting said first end of said second elongated bracket to said kingpin bracket, a second end on said second elongated link, second connecting means connecting said second end of said second elongated link to said vehicle body to cause said kingpin bracket to pivot about said second pivot means as said elongated link pivots about said pivot means, a third elongated link, a first end on said third elongated link, third connecting means connecting said first end of said third elongated link to said steering arm, a steering member on said body, a second end on said third elongated link, fourth means connecting said second end of said third elongated link to said steering member to selectively turn said kingpin sleeve to turn said axle and said wheel mounted thereon, said elongated link and said second and third elongated links being dimensioned and relatively positioned relative to each other to permit said elongated link to pivot without imparting any substantial oscillatory turning movement to said wheel while permitting said steering member to run said wheel in all pivotal positions of said elongated link.

45. A vehicle as set forth in claim 44 wherein said second pivot means is coaxial with said axle.

46. A vehicle as set forth in claim 45 wherein said elongated link and said second elongated link have first and second longitudinal axes, respectively, and wherein said first and second longitudinal axes are substantially parallel.

47. A vehicle as set forth in claim 46 wherein said third elongated link has a third longitudinal axis which is substantially parallel to said first and second longitudinal axes.

48. A vehicle as set forth in claim 47 wherein the distance between the axis of said second pivot means and said first connecting means is substantially equal to the distance between said pivot means and said second connecting means.

49. A vehicle as set forth in qlaim 48 wherein the distance between said first and second third connecting means is substantially equal to the distance between said second and fourth connecting means.

50. A vehicle as set forth in claim 49 wherein said first, second, third and fourth connecting means comprise pivotal connections.

51. A vehicle as set forth in claim 50 wherein said third and fourth pivotal connections comprise ball joints.

52. A vehicle as set forth in claim 43 wherein each of said wheels is mounted on an axle, and wherein said steering linkage for at least one wheel includes a kingpin, a kingpin bracket mounting said kingpin on said elongated link, a kingpin sleeve pivotally mounted on said kingpin, a steering arm extending outwardly from said kingpin sleeve, a steering link, a steering link pivot pivotally mounting said steering link on said body, a second elongated link having first and second ends, first connecting means connecting said first end to said elongated link, second connecting means connecting said second end to said steering link to effect pivotal movement thereof in response to said pivotal movement of said elongated link, planetary gear means including a sun gear and a planet gear and an idler gear therebetween, means pivotally mounting said planetary gear means relative to said steering link including planet gear pivot means pivotally mounting said planet gear on said steering link, a third elongated link having third and fourth ends, third connecting means connecting said third end to said steering arm, and fourth connecting means conneting said fourth end to said planet gear, said pivotal movement of said steering link when said sun gear is stationary causing pivotal movement of said planet gear in response to pivotal movement of said steering link to tend to compensate for pivotal movement of said steering link in response to said pivotal movement of said elongated link.

53. A vehicle as set forth in claim 52 wherein said first and second connecting means comprise pivotal connections.

54. A vehicle as set forth in claim 53 wherein said third and fourth connecting means comprise pivotal connections.

55. A vehicle as set forth in claim 54 wherein said first and second connecting means comprise pivotal connections.

56. A vehicle as set forth in claim 52 wherein said sun gear is pivotally mounted on said steering link pivot.

57. A vehicle as set forth in claim 52 including steering linkage means on said body coupled to said sun gear for selectively turning said sun gear to cause turning of said planet gear to drive said third elongated link to turn said wheel while said planet gear also has said pivotal movement imparted thereto for tending to compensate for pivotal movement of said steering link imparted thereto by said pivotal movement of said elongated link.

58. A vehicle as set forth in claim 43 including driving means coupled to at least one of said wheels for positively driving said wheel.

59. A vehicle as set forth in claim 44 including driving means coupled to said wheel for positively driving said wheel.

60. A vehicle as set forth in claim 59 wherein said driving means comprises drive means within said elongated link, and means including a RZEPPA joint coupling said drive means to said axle.

61. A vehicle as set forth in claim 60 wherein said kingpin and kingpin sleeve are formed with said kingpin extending outwardly from opposite sides of said sleeve, and wherein said kingpin sleeve is hollow, and wherein said RZEPPA joint is located within said kingpin sleeve.

62. A vehicle as set forth in claim 52 including driving means coupled to said wheel for driving said wheel.

63. A vehicle as set forth in claim 62 wherein said driving means includes means located within said elongated link.

64. A vehicle as set forth in claim 63 wherein said means located within said elongated link comprises an elongated shaft, a first bevel gear on said elongated shaft, and a second bevel gear on said axle in mesh with said first bevel gear.

65. A vehicle comprising a body, elongated links having outer end portions, pivot means mounting said elongated links on opposite sides of said body for permitting said links to pivot as said vehicle traverses uneven terrain, wheels mounted on said outer end portions, steering linkage means coupled between said body and said wheels for selectively applying a turning force to said wheels while permitting said links to pivot without imparting any substantial oscillatory movement to said wheels in response to such pivoting of said links, and means on said vehicle for imparting a positive drive to said wheels.

66. A vehicle as set forth in claim 65 wherein said drive means are located within said elongated links, and wherein each of said wheels is mounted on kingpin means, a kingpin bracket mounting said kingpin, pivot means pivotally mounting said kingpin brackets on said elongated links, and a RZEPPA connection within said kingpin means between said drive means within said elongated links and said wheels.

67. A vehicle as set forth in claim 65 wherein said drive means are located within said elongated links and wherein each of said wheels is mounted on a kingpin, and a RZEPPA connection between said drive means and said wheels.

* * * * *